United States Patent
Brenner et al.

(10) Patent No.: US 12,053,895 B2
(45) Date of Patent: Aug. 6, 2024

(54) CAPTURING ENVIRONMENTAL SCANS USING AUTOMATED TRANSPORTER ROBOT

(71) Applicant: FARO Technologies, Inc., Lake Mary, FL (US)

(72) Inventors: Mark Brenner, Asperg (DE); Aleksej Frank, Kornwestheim (DE); Ahmad Ramadneh, Kornwestheim (DE); Mufassar Waheed, Ditzingen (DE); Oliver Zweigle, Stuttgart (DE)

(73) Assignee: FARO Technologies, Inc., Lake Mary, FL (US)

( * ) Notice: Subject to any disclaimer, the term of this patent is extended or adjusted under 35 U.S.C. 154(b) by 315 days.

(21) Appl. No.: 17/702,904

(22) Filed: Mar. 24, 2022

(65) Prior Publication Data
US 2022/0410401 A1    Dec. 29, 2022

Related U.S. Application Data

(60) Provisional application No. 63/213,920, filed on Jun. 23, 2021.

(51) Int. Cl.
*B25J 9/16*    (2006.01)
*B25J 13/08*    (2006.01)

(52) U.S. Cl.
CPC .......... *B25J 9/1697* (2013.01); *B25J 9/1653* (2013.01); *B25J 9/1664* (2013.01); *B25J 13/089* (2013.01)

(58) Field of Classification Search
CPC ...... B25J 9/1697; B25J 9/1653; B25J 9/1664; B25J 13/089
See application file for complete search history.

(56) References Cited

U.S. PATENT DOCUMENTS

| 8,705,012 B2 | 4/2014 | Greiner et al. |
| 9,113,154 B2 | 8/2015 | Bridges et al. |

(Continued)

FOREIGN PATENT DOCUMENTS

| WO | 2020123123 A2 | 6/2020 |

OTHER PUBLICATIONS

European Search Report; Issued: Nov. 4, 2022; Application No. 22175605.9; Filed: May 26, 2022; 14 pages.

(Continued)

*Primary Examiner* — Jamil Ahmed
(74) *Attorney, Agent, or Firm* — McCarter & English, LLP; Dave S. Christensen

(57) ABSTRACT

A system includes a transporter robot with a motion controller that changes the transporter robot's poses during transportation. A scanning device is fixed to the transporter robot. One or more processors are coupled to the transporter robot and the scanning device to generate a map of the surrounding environment. At a timepoint T1, when the transporter robot is stationary at a first location, a first pose of the transporter robot is captured. During transporting the scanning device, at a timepoint T2, the scanning device captures additional scan-data of a portion of the surrounding environment. In response, the motion controller provides a second pose of the transporter robot at T2. A compensation vector and a rotation for the scan-data are determined based on a difference between the first pose and the second pose. A revised scan-data is computed, and the revised scan-data is registered to generate the map.

20 Claims, 11 Drawing Sheets

(56) References Cited

U.S. PATENT DOCUMENTS

| | | |
|---|---|---|
| 10,378,889 B2 | 8/2019 | Grau |
| 10,462,444 B2 | 10/2019 | Wolke et al. |
| 10,598,479 B2 | 3/2020 | Becker et al. |
| 10,657,691 B2 | 5/2020 | Zweigle et al. |
| 10,812,694 B2 | 10/2020 | Zhang |
| 10,824,773 B2 | 11/2020 | Santos et al. |
| 10,830,889 B2 | 11/2020 | Santos et al. |
| 10,907,955 B2 | 2/2021 | Armstrong et al. |
| 10,914,569 B2 | 2/2021 | Zweigle et al. |
| 10,989,532 B2 | 4/2021 | Buback et al. |
| 11,408,728 B2 | 8/2022 | Becker et al. |
| 2012/0069352 A1 | 3/2012 | Ossig et al. |
| 2016/0291160 A1 | 10/2016 | Zweigle et al. |
| 2017/0067734 A1 | 3/2017 | Heidemann et al. |
| 2018/0204338 A1* | 7/2018 | Narang ............ G06T 7/55 |
| 2019/0063907 A1 | 2/2019 | Grau |
| 2019/0137627 A1 | 5/2019 | Zweigle et al. |
| 2019/0219700 A1 | 7/2019 | Coombe et al. |
| 2019/0272655 A1 | 9/2019 | Santos et al. |
| 2019/0364257 A1 | 11/2019 | Wolke et al. |
| 2020/0041627 A1 | 2/2020 | Becker et al. |
| 2020/0109937 A1 | 4/2020 | Zweigle et al. |
| 2020/0355488 A1 | 11/2020 | Zweigle et al. |
| 2021/0183081 A1 | 6/2021 | Wohlfeld et al. |
| 2021/0373165 A1 | 12/2021 | Brenner et al. |
| 2021/0373167 A1 | 12/2021 | Buback et al. |
| 2022/0051422 A1 | 2/2022 | Parian |
| 2022/0101601 A1 | 3/2022 | Frank et al. |
| 2022/0178492 A1 | 6/2022 | Waheed et al. |
| 2022/0318540 A1 | 10/2022 | Wohlfeld et al. |

OTHER PUBLICATIONS

Kim et al., "SLAM-driven robotic mapping and registration of 3D point clouds," Automation in Construction, vol. 89, Feb. 3, 2018, pp. 38-48.

Liu et al., "Real-Time 6D Lidar SLAM in Large Scale Natural Terrains for UGV," 2018 IEEE Intelligent Vehicles Symposium (IV), Jun. 26-30, 2018, pp. 662-667.

* cited by examiner

CAPTURING ENVIRONMENTAL SCANS USING AUTOMATED TRANSPORTER ROBOT

CROSS REFERENCE TO RELATED APPLICATIONS

This application claims the benefit of U.S. Provisional Application Ser. No. 63/213,920, filed Jun. 23, 2021, the entire disclosure of which is incorporated herein by reference.

BACKGROUND

The present application is directed to a system that optically scans an environment, such as a building, and in particular, to a mobile scanning system that generates two-dimensional (2D) and three-dimensional (3D) scans of the environment being integrated with an automated transporter robot.

Automated scanning of an environment is desirable as a number of scans may be performed in order to obtain a complete scan of the area. Various techniques may be used, such as time-of-flight (TOF) or triangulation methods, for example. A TOF laser scanner is a scanner in which the distance to a target point is determined based on the speed of light in air between the scanner and a target point. Laser scanners are typically used for scanning closed or open spaces such as interior areas of buildings, industrial installations, and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored, and sent to a processor or processors to generate an image, 2D/3D, representing the scanned area or object. Generating an image requires at least three values for each data point. These three values may include the distance and two angles, or may be transformed values, such as the x, y, z coordinates. In an embodiment, an image is also based on a fourth gray-scale value, which is a value related to the irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera's digital images to an operator of the laser scanner. By viewing the camera images, the operator of the scanner can determine the field of view of the measured volume and adjust settings on the laser scanner to measure over a larger or smaller region of space. In addition, the digital images from the camera may be transmitted to a processor to add color to the scanner image. To generate a color scanner image, at least three positional coordinates (such as x, y, z) and three color values (such as red, green, blue "RGB") are collected for each data point.

In contrast, a triangulation system, such as a scanner, projects either a line of light (e.g., from a laser line probe) or a pattern of light (e.g., from a structured light) onto the surface. In this system, a camera is coupled to a projector in a fixed mechanical relationship. The light/pattern emitted from the projector is reflected off of the surface and detected by the camera. Since the camera and projector are arranged in a fixed relationship, the distance to the object may be determined from captured images using trigonometric principles. Triangulation systems provide advantages in quickly acquiring coordinate data over large areas.

In some systems, during the scanning process, the scanner acquires, at different times, a series of images of the patterns of light formed on the object surface. These multiple images are then registered relative to each other so that the position and orientation of each image relative to the other images are known. Where the scanner is handheld, various techniques have been used to register the images. One common technique uses features in the images to match overlapping areas of adjacent image frames. This technique works well when the object being measured has many features relative to the field of view of the scanner. However, if the object contains a relatively large flat or curved surface, the images may not properly register relative to each other.

A 3D image of a scene may require multiple scans from different registration positions. The overlapping scans are registered in a joint coordinate system, for example, as described in the U.S. Published Patent Application No. 2012/0069352 ('352), the contents of which are incorporated herein by reference. Such registration is performed by matching targets in overlapping regions of the multiple scans. The targets may be artificial targets such as spheres or checkerboards, or they may be natural features such as corners or edges of walls. Some registration procedures involve relatively time-consuming manual procedures such as identifying by a user each target and matching the targets obtained by the scanner in each of the different registration positions. Some registration procedures also require establishing an external "control network" of registration targets measured by an external device such as a total station.

However, even with these improvements, it is today difficult to remove the need for a user to carry out the manual registration steps as described above. In a typical case, only 30% of 3D scans can be automatically registered to scans taken from other registration positions. Today such registration is seldom carried out at the site of the 3D measurement but instead in a remote location following the scanning procedure. In a typical case, a project requiring a week of scanning requires two to five days to manually register the multiple scans. This adds to the cost of the scanning project. Furthermore, the manual registration process sometimes reveals that the overlap between adjacent scans was insufficient to provide proper registration. In other cases, the manual registration process may reveal that certain sections of the scanning environment have been omitted. When such problems occur, the operator must return to the site to obtain additional scans. In some cases, it is not possible to return to a site. A building that was available for scanning at one time may be impossible to access at a later time, for example. Further, a forensics scene of an automobile accident or a homicide is often not available for taking scans for more than a short time after the incident.

It should be appreciated that where an object (e.g., a wall, a column, or a desk) blocks the beam of light, that object will be measured, but any objects or surfaces on the opposite side will not be scanned since they are in the shadow of the object relative to the scanner. Therefore, to obtain a more complete scan of the environment, the TOF scanner is moved to different locations and separate scans are performed. Subsequent to the scanning, the 3D coordinate data (i.e., the point cloud) from each of the individual scans are registered to each other and combined to form a 3D image or model of the environment.

Some existing measurement systems have been mounted to a movable structure, such as a cart, and moved on a continuous basis through the building to generate a digital representation of the building. However, these techniques generally provide lower data quality than stationary scans. These systems tend to be more complex and require specialized personnel to perform the scan.

Accordingly, while existing scanners are suitable for their intended purposes, what is needed is a scanner having certain features of embodiments of the present disclosure.

BRIEF DESCRIPTION

According to one or more embodiments, a system includes a transporter robot that comprises a motion controller and one or more motion apparatus that causes the transporter robot to change poses during transportation. The system further includes a scanning device configured to capture scan-data of surrounding environment, the scanning device fixed to the transporter robot via a mount. The system further includes one or more processors operably coupled to the transporter robot and the scanning device, wherein the one or more processors are operable to generate a map of the surrounding environment by performing a method. The method includes recording, at a timepoint T1, at which the transporter robot is stationary at a first location, a first pose of the transporter robot. The method further includes transporting the scanning device, by the transporter robot, from the first location to another location. The method further includes, during the transporting, at a timepoint T2, capturing, by the scanning device, the scan-data corresponding to a portion of the surrounding environment. The method further includes, in response to the capturing of the scan-data, receiving, from the motion controller, a second pose of the transporter robot at the timepoint T2. Further, a compensation vector and a rotation for the scan-data are determined based on a difference between the first pose and the second pose of the transporter robot. A revised scan-data is computed based on the compensation vector and the rotation, and further, the revised scan-data is registered to generate the map.

In some examples, the scan-data comprises a point cloud.

In some examples, the scanning device captures an anchor scan at timepoint T1 at the first location. In some examples, the scanning device captures another anchor scan at timepoint T3 at the another location.

In some examples, the pose of the transporter robot includes kinematics data indicative of a state of motion of the transporter robot.

In some examples, the pose of the transporter robot is determined using an image captured by a camera integrated with the transporter robot.

In some examples, the camera uses a wide-angle lens and the pose is determined by computing a difference between a first image captured at T1 and a second image captured at T2.

In some examples, determining the compensation vector and the rotation further comprises determining a difference between a first pose of the scanning device and a second pose of the scanning device, independent of the transporter robot, a pose of the scanning device is determined using an inertial measurement unit of the scanning device.

According to one or more embodiments, a method for generating a map of the surrounding environment includes recording, by one or more processors, at a timepoint T1, at which a transporter robot is stationary at a first location, a first pose of the transporter robot, wherein the transporter robot is mounted with a scanning device configured to capture scan-data of surrounding environment. The method further includes transporting the scanning device, by the transporter robot, from the first location to another location. The method further includes, during the transporting, at a timepoint T2, capturing, by the scanning device, the scan-data corresponding to a portion of the surrounding environment. The method further includes, in response to the capturing of the scan-data, performing by the by one or more processors, receiving, from the transporter robot, a second pose of the transporter robot at the timepoint T2. Further, a compensation vector and a rotation for the scan-data are determined based on a difference between the first pose and the second pose of the transporter robot. A revised scan-data is computed based on the compensation vector and the rotation, and further, the revised scan-data is registered to generate the map.

In some examples, the scan-data comprises a point cloud.

In some examples, the scanning device captures an anchor scan at timepoint T1 at the first location.

In some examples, the scanning device captures another anchor scan at timepoint T3 at the another location.

In some examples, the pose of the transporter robot includes kinematics data indicative of a state of motion of the transporter robot.

In some examples, the pose of the transporter robot is determined using an image captured by a camera integrated with the transporter robot.

In some examples, the camera uses a wide-angle lens and the pose is determined by computing a difference between a first image captured at T1 and a second image captured at T2.

In some examples, determining the compensation vector further comprises determining a difference between a first pose of the scanning device and a second pose of the scanning device, independent of the transporter robot, a pose of the scanning device is determined using an inertial measurement unit of the scanning device.

According to one or more embodiments, a non-transitory computer-readable medium having program instructions embodied therewith, the program instructions readable by a processor to cause the processor to perform a method to generate a map of a surrounding environment. The method includes recording at a timepoint T1, at which a transporter robot is stationary at a first location, a first pose of the transporter robot, wherein the transporter robot is mounted with a scanning device configured to capture scan-data of surrounding environment. The method further includes transporting the scanning device, by the transporter robot, from the first location to another location. The method further includes, during the transporting, at a timepoint T2, capturing, by the scanning device, the scan-data corresponding to a portion of the surrounding environment. The method further includes, in response to the capturing of the scan-data, performing by the by one or more processors, receiving, from the transporter robot, a second pose of the transporter robot at the timepoint T2. Further, a compensation vector and a rotation for the scan-data are determined based on a difference between the first pose and the second pose of the transporter robot. A revised scan-data is computed based on the compensation vector and the rotation, and further, the revised scan-data is registered to generate the map.

In some examples, the scanning device captures an anchor scan at timepoint T1 at the first location, and captures another anchor scan at timepoint T3 at the another location.

In some examples, the pose of the transporter robot includes kinematics data indicative of a state of motion of the transporter robot.

In some examples, the pose of the transporter robot is determined using an image captured by a camera integrated with the transporter robot.

In some examples, determining the compensation vector further comprises determining a difference between a first pose of the scanning device and a second pose of the scanning device, independent of the transporter robot, a pose of the scanning device is determined using an inertial measurement unit of the scanning device. According to one or more embodiments, anon-transitory computer-readable medium has program instructions embodied therewith, the program instructions readable by a processor to cause the processor to perform a method performing a simultaneous location and mapping of a scanning device in a surrounding environment.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example, with reference to the drawings.

DETAILED DESCRIPTION

Embodiments of the present disclosure provide technical solutions to technical challenges in existing environment scanning systems. The scanning systems can capture two-dimensional or three-dimensional (3D) scans. Such scans can include 2D maps, 3D point clouds, or a combination thereof. The scans can include additional components, such as annotations, images, textures, measurements, and other details.

Embodiments of the present disclosure facilitate a mobile scanning platform that allows for simultaneous scanning, mapping, and trajectory generation of an environment while the platform is moving. Embodiments of the present disclosure provide for a mobile scanning platform that may be used to scan an environment in an autonomous or semi-autonomous manner.

Typically, when capturing a scan of an environment, a version of the simultaneous localization and mapping (SLAM) algorithm is used. For completing such scans, a scanner, such as the FARO® SCANPLAN®, FARO® SWIFT®, FARO® FREESTYLE®, or any other scanning system incrementally builds the scan of the environment, while the scanner is moving through the environment, and simultaneously the scanner tries to localize itself on this scan that is being generated. An example of a handheld scanner is described in U.S. patent application Ser. No. 15/713,931, the contents of which are incorporated by reference herein in its entirety. This type of scanner may also be combined with another scanner, such as a time of flight scanner as is described in commonly owned U.S. patent application Ser. No. 16/567,575, the contents of which are incorporated by reference herein in its entirety. It should be noted that the scanners listed above are just examples and that the type of scanner used in one or more embodiments does not limit the features of the technical solutions described herein.

Figure 1:
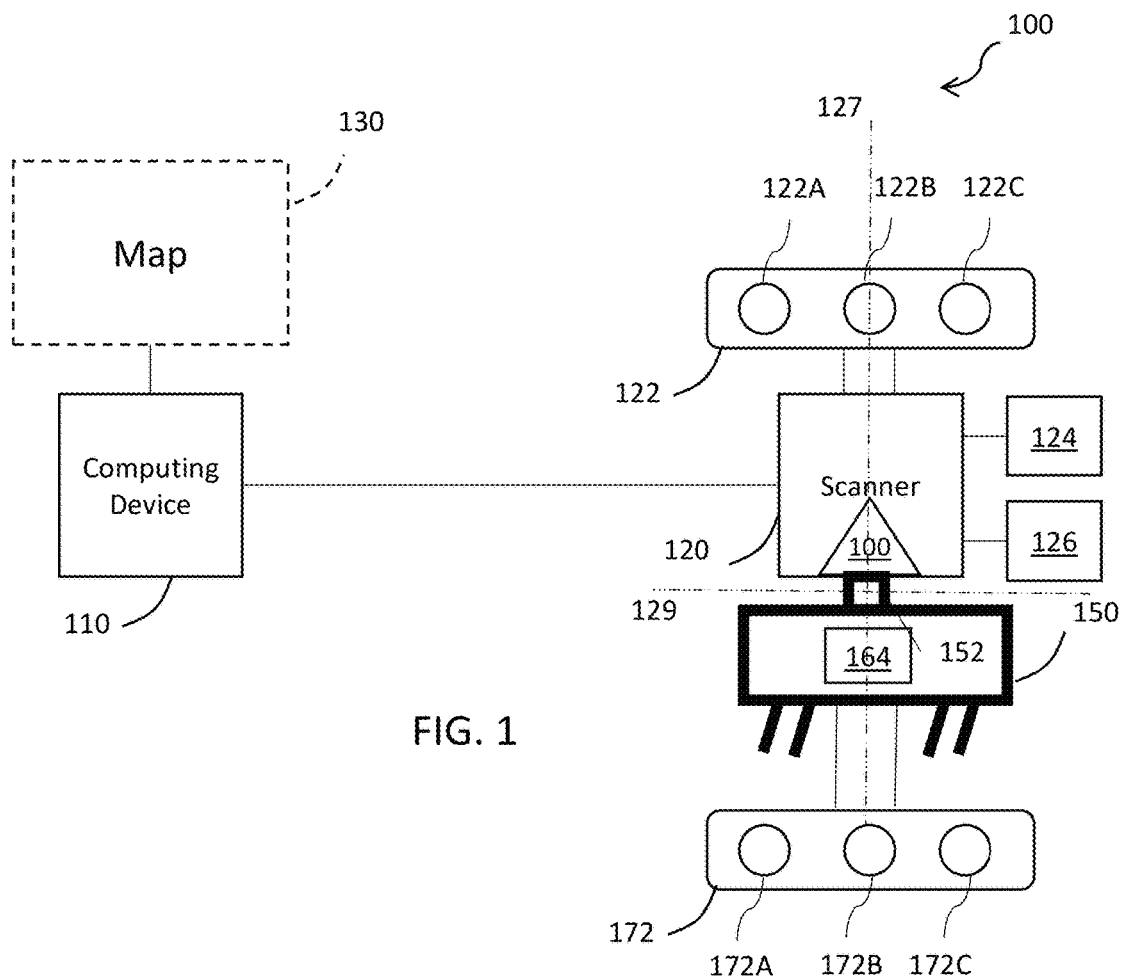
FIG. 1 depicts a system for scanning an environment according to one or more embodiments of the present disclosure.

FIG. 1 depicts a system for scanning an environment according to one or more embodiments of the present disclosure. The system 100 includes a computing system 110 coupled with a scanner 120. The coupling facilitates wired and/or wireless communication between the computing system 110 and the scanner 120. The scanner 120 can include a 2D scanner, a 3D scanner, or a combination of both. The scanner 120 is capturing measurements of the surroundings of the scanner 120. The measurements are transmitted to the computing system 110 to generate a map 130 of the environment in which the scanner is being moved. The map 130 can be generated by combining several submaps. Each submap is generated using SLAM.

Figure 2:
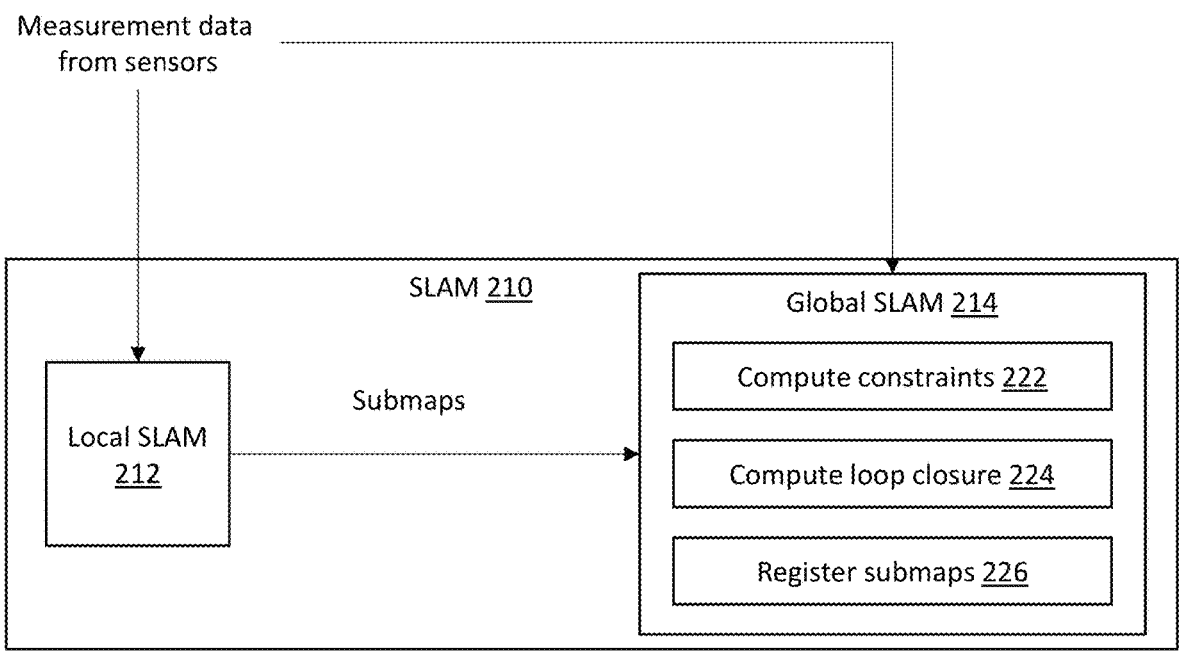
FIG. 2 depicts a flowchart of a method for using sensor data for simultaneously locating and mapping a scanner in an environment according to one or more embodiments of the present disclosure.

FIG. 2 depicts a high-level operational flow for implementing SLAM according to one or more embodiments of the present disclosure. Implementing SLAM 210 includes generating one or more submaps corresponding to one or more portions of the environment. The submaps are generated using the one or more sets of measurements from the sets of sensors 122. Generating the submaps may be referred to as "local SLAM" (212). The submaps are further combined by the SLAM algorithm to generate the map 130. Combining the submpas process may be referred to as "global SLAM" (214). Together, generating the submaps and the final map of the environment is referred to herein as implementing SLAM, unless specifically indicated otherwise.

It should be noted that the operations shown in FIG. 2 are at a high level, and that typical implementations of SLAM 210 can include operations such as filtering, sampling, and others, which are not depicted.

The local SLAM 212 facilitates inserting a new set of measurement data captured by the scanner 120 into a submap construction. This operation is sometimes referred to as "scan matching." A set of measurements can include one or more point clouds, distance of each point in the point cloud(s) from the scanner 120, color information at each point, radiance information at each point, and other such sensor data captured by a set of sensors 122 that is equipped on the scanner 120. For example, the sensors 122 can include a LIDAR 122A, a depth camera 122B, a camera 122C, etc. The scanner 120 can also include an inertial measurement unit (IMU) 126 to keep track of a 3D orientation of the scanner 120.

The captured measurement data is inserted into the submap using an estimated pose of the scanner 120. The pose can be extrapolated by using the sensor data from sensors such as IMU 126, (sensors besides the range finders) to predict where the scanned measurement data is to be inserted into the submap. Various techniques are available for scan matching. For example, a point to inset the measured data can be determined by interpolating the submap and sub-pixel aligning the scan. Alternatively, the measured data is matched against the submap to determine the point of insertion. A submap is considered complete when the local SLAM 212 has received at least a predetermined amount of measurement data. Local SLAM 212 drifts over time and global SLAM 214 is used to fix this drift.

It should be noted that a submap is a representation of a portion of the environment and that the map 130 of the environment includes several such submaps "stitched" together. Stitching the maps together includes determining one or more landmarks on each submap that is captured and aligning and registering the submaps with each other to generate the map 130. Further, generating each submap includes combining or stitching one or more sets of measurements. Combining two sets of measurements requires matching, or registering one or more landmarks in the sets of measurements being combined.

Accordingly, generating each submap and further combining the submaps includes registering a set of measurements with another set of measurements during the local SLAM (212), and further, generating the map 130 includes registering a submap with another submap during the global SLAM (214). In both cases, the registration is done using one or more landmarks.

Here, a "landmark" is a feature that can be detected in the captured measurements and be used to register a point from the first set of measurements with a point from the second set of measurements. For example, the landmark can facilitate registering a 3D point cloud with another 3D point cloud or to register an image with another image. Here, the registration can be done by detecting the same landmark in the two images (or point clouds) that are to be registered with each other. A landmark can include but is not limited to features such as a doorknob, a door, a lamp, a fire extinguisher, or any other such identification mark that is not moved during the scanning of the environment. The landmarks can also include stairs, windows, decorative items (e.g., plant, picture-frame, etc.), furniture, or any other such structural or stationary objects. In addition to such "naturally" occurring features, i.e., features that are already present in the environment being scanned, landmarks can also include "artificial" landmarks that are added by the operator of the scanner 120. Such artificial landmarks can include identification marks that can be reliably captured and used by the scanner 120. Examples of artificial landmarks can include predetermined markers, such as labels of known dimensions and patterns, e.g., a checkerboard pattern, a target sign, or other such preconfigured markers (e.g., spherical markers).

The global SLAM (214) can be described as a pose graph optimization problem. As noted earlier, the SLAM algorithm is used to provide concurrent construction of a model of the environment (the scan) and an estimation of the state of the scanner 120 moving within the environment. In other words, SLAM provides a way to track the location of a robot in the world in real-time and identify the locations of landmarks such as buildings, trees, rocks, walls, doors, windows, paintings, décor, furniture, and other world features. In addition to localization, SLAM also generates or builds up a model of the environment to locate objects, including the landmarks that surround the scanner 120 and so that the scan data can be used to ensure that the scanner 120 is on the right path as the scanner 120 moves through the world, i.e., environment. So, the technical challenge with the implementation of SLAM is that while building the scan, the scanner 120 itself might lose track of where it is by virtue of its motion uncertainty because there is no presence of an existing map of the environment because the map is being generated simultaneously.

The basis for SLAM is to gather information from the set of sensors 120 and motions over time and then use information about measurements and motion to reconstruct a map of the environment. The SLAM algorithm defines the probabilities of the scanner 120 being at a certain location in the environment, i.e., at certain coordinates, using a sequence of constraints. For example, consider that the scanner 120 moves in some environment, the SLAM algorithm is input the initial location of the scanner 120, say (0,0) initially, which is also called as Initial Constraints. The SLAM algorithm is then inputted several relative constraints that relate each pose of the scanner 120 to a previous pose of the scanner 120. Such constraints are also referred to as relative motion constraints.

The technical challenge of SLAM can also be described as follows. Consider that the scanner is moving in an unknown environment, along a trajectory described by the sequence of random variables $x_{1:T}=\{x_1, \ldots, x_T\}$. While moving, the scanner acquires a sequence of odometry measurements $u_{1:T}=\{u_1, \ldots, u_T\}$ and perceptions of the environment $z_{1:T}=\{z_1, \ldots, z_T\}$. The "perceptions" include the captured data and the mapped detected planes 410. Solving the full SLAM problem now includes estimating the posterior probability of the trajectory of the scanner 120 $x_{1:T}$ and the map M of the environment given all the measurements plus an initial position $x_0$: $P(x_{1:T}, M|z_{1:T}, u_{1:T}, x_0)$. The initial position $x_0$ defines the position in the map and can be chosen arbitrarily. There are several known approaches to implement SLAM, for example, graph SLAM, multi-level relaxation SLAM, sparse matrix-based SLAM, hierarchical SLAM, etc. The technical solutions described herein are applicable regardless of which technique is used to implement SLAM.

Figure 3:
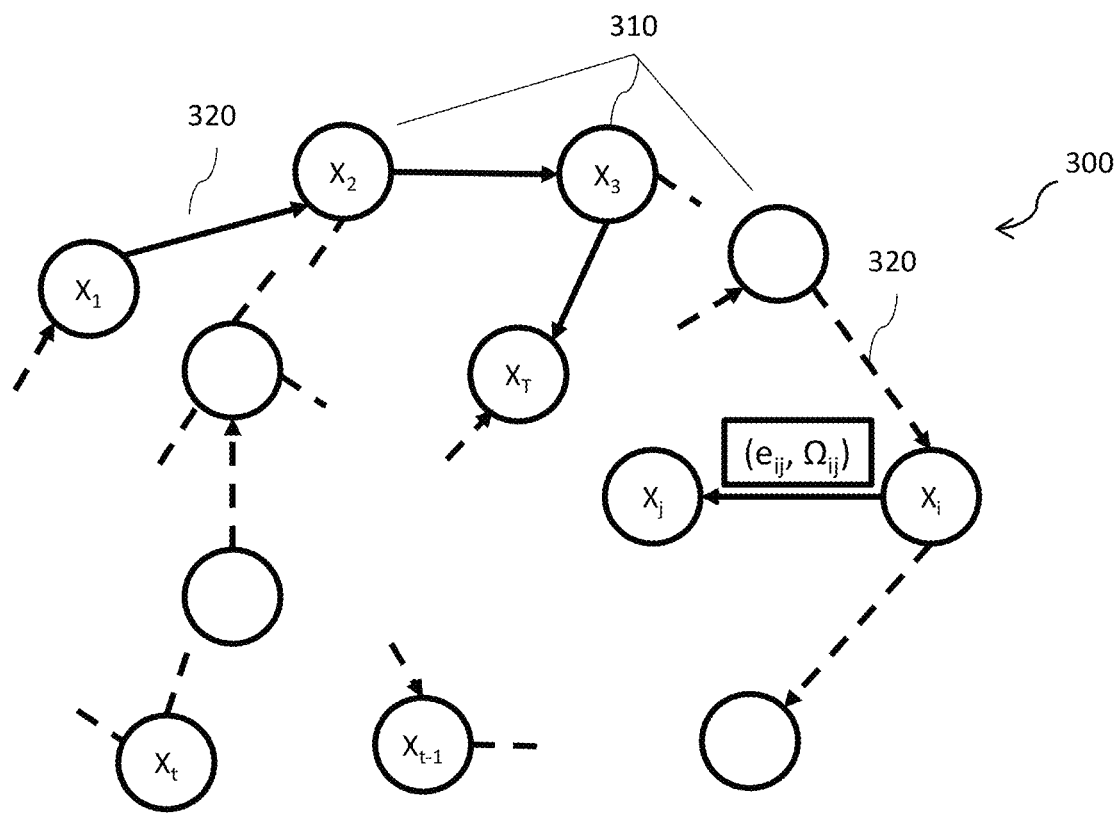
FIG. 3 depicts a graphical representation of an example SLAM implementation.

FIG. 3 depicts a graphical representation of an example SLAM implementation. In the depicted representation of the SLAM as a graph 300, every node 310 corresponds to a pose of the scanner 120. Nearby poses are connected by edges 320 that model spatial constraints between poses of the scanner 120 arising from measurements. Edges $e_{t-1,t}$ between consecutive poses model odometry measurements, while the other edges represent spatial constraints arising from multiple observations of the same part of the environment.

A graph-based SLAM approach constructs a simplified estimation problem by abstracting the raw sensor measurements. These raw measurements are replaced by the edges 320 in graph 300, which can then be seen as "virtual measurements." An edge 320 between two nodes 310 are labeled with a probability distribution over the relative locations of the two poses, conditioned to their mutual measurements. In general, the observation model $P(z_t|x_t, M_t)$ is multi-modal, and therefore the Gaussian assumption does not hold. This means that a single observation $z_t$ might result in multiple potential edges connecting different poses in the graph, and the graph connectivity needs itself to be described as a probability distribution. Directly dealing with this multi-modality in the estimation process would lead to a large combinatorial increase of complexity. As a result, most practical approaches restrict the estimate to the most likely topology. Hence, a constraint resulting from observation has to be determined.

If the observations are affected by (locally) Gaussian noise and the data association is known, the goal of a graph-based mapping algorithm is to compute a Gaussian approximation of the posterior over the trajectory of the scanner 120. This involves computing the mean of this Gaussian as the configuration of the nodes 310 that maximizes the likelihood of the observations. Once the mean is known, the information matrix of the Gaussian can be obtained in a straightforward fashion, as is known in the art. In the following, the task of finding is characterized by this maximum as a constraint optimization problem.

Let $x=(x_1, \ldots, x_T)^T$ be a vector of parameters, where $x_i$ describes the pose of node i. Let $z_{ij}$ and $\Omega_{ij}$ be respectively the mean and the information matrix of a virtual measurement between the node i and the node j. This virtual measurement is a transformation that makes the observations acquired from i maximally overlap with the observation acquired from j. Further, let $\hat{z}_{ij}(x_i, x_j)$ be the prediction of a virtual measurement given a configuration of the nodes $x_i$, and $x_j$. Usually, this prediction is the relative transformation between the two nodes. Let $e(x_i, x_j, z_{ij})$ be a function that computes a difference between the expected observation $\hat{z}_{ij}$ and the real observation z captured by the scanner 120. For simplicity of notation, the indices of the measurement are encoded in the indices of the error function: $e_{ij}(x_i, x_j)=z_{ij}-\hat{z}_{ij}(x_i, x_j)$.

If C is the set of pairs of indices for which a constraint (observation) z exists, the goal of a maximum likelihood approach is to find the configuration of the nodes x* that minimizes the negative log-likelihood F(x) of all the observations: $F(x)=\Sigma_{(i,j)\in C}F_{ij}$, where $F_{ij}=e_{ij}^T\Omega_{ij}e_{ij}$. Accordingly, implementing SLAM includes solving the following equation and computing a Gaussian approximation of the posterior over the trajectory of the scanner 120: $x^*=\text{argmin}_x F(x)$.

Several techniques are known for solving the above equations, for example, using Gauss-Newton or the Levenberg-Marquardt algorithms. The technical solutions provided by one or more embodiments of the present disclosure can be used regardless of how the SLAM algorithm is implemented, i.e., regardless of how the above equations are solved. The technical solutions described herein provide the set of constraints C that is used for implementing the SLAM algorithm, using whichever technique is to be used.

Accordingly, implementing global SLAM 214 includes determining constraints (222) between nodes 320, i.e., submaps, objects, landmarks, or any other elements that are matched. Non-global constraints (also known as inter submaps constraints) are built automatically between nodes 310 that are closely following each other on a trajectory of the scanner 120 in the environment. Global constraints (also referred to as loop closure constraints or intra submaps constraints) are constraints between a new submap and previous nodes 310 that are considered "close enough" in space and a strong fit, i.e., a good match when running scan matching. Here, "close enough" is based on predetermined thresholds, for example, the distance between the same landmark from two submaps being within a predetermined threshold.

For example, existing implementations of SLAM use measurements, such as LIDAR data, from the set of sensors 122, to aggregate the measurements to generate the submaps and eventually the map 130. A technical challenge with such implementations is that the matching of the sets of measurements is inaccurate due to ambiguities or missing data. This may lead to misaligned sets of measurements and/or submaps, which in turn, cause an erroneous submap and/or map 130. Typically, "loop closure" 224 is used to prevent such errors by compensating for accumulated errors. However, loop closure cannot be used in cases where the same landmarks are not identified in two sets of measurements or submaps that are being combined or stitched. One of the causes of such technical challenges is that the existing techniques only rely on the captured data from the sensors 122 without any semantic or geometric analysis of the measurement data.

To address the technical challenges with the loop closure, such as mismatching landmarks, and missing loop closure, embodiments of the present disclosure use a transporter robot 150 (see FIG. 1). The scanner 120 is fixed on the transporter robot 150, for example, SPOT® from BOSTON DYNAMICS®, using a mount 152. It should be noted that while FIG. 1 depicts a single scanner 120 mounted on the transporter robot 150. In other embodiments, the transporter robot 150 can be fixed with multiple scanners 120. The scanners 120 can be of different types. For example, the transporter robot 150 can be mounted with a 3D scanner 120 and a 2D scanner 120. Both the scanners 120 can be communicating with the computing device 110, for example, to receive commands from the computing device 110 and/or to transmit captured scanned data to the computing device 110.

The mount 152 facilitates the scanner 120 to change pose using a motion controller 128 of the scanner 120. For example, the motion controller 128 can cause the scanner 120 to rotate around its own vertical axis 127 or horizontal axis 129 to capture scan-data from 360 degrees around the scanner 120. In one or more embodiments, the IMU 126 tracks the pose of the scanner 120 that includes monitoring any rotation angles of the scanner when capturing a scan-data. The position of the mount 152 in relation to the transporter robot 150 is fixed. Accordingly, given the position of the transporter robot 150, the position of the scanner 120 can be determined.

The transporter robot 150 includes a motion controller 160 that controls the movement of the transporter robot 150 through the surrounding environment. The motion controller 160, in one or more embodiments, sends commands to one or more motion devices 162 of the transporter robot 150. The motion devices 162 can be robotic legs, wheels, or any other such motion devices that facilitate the transporter robot 150 to move in the surrounding environment. The transporter robot 150 can transport the mounted scanner(s) 120 around the surrounding environment accordingly. The motion device 162 can cause the transporter robot 150 to sway, shake, vibrate, etc., which in turn causes instability for the scanner 120 that is mounted on the transporter robot 150. The transporter robot 150 can include an IMU 164 that monitors the orientation of one or more components of the transporter robot 150, and particularly, the mount 152 on which the scanner 120 is fixed. In one or more embodiments, the IMU 164 can be queried to determine the orientation of the motion devices 162, the mount 152, or any other component of the transporter robot 150.

The transporter robot 150 includes additional sensors 172. The sensors 172 can include a camera 172a, a machine-readable code scanner 172b, a LIDAR 172c, etc. The sensors 172 can provide additional measurements that can be used to determine a position of the transporter robot 150 in the surrounding environment. Additionally, the measurements from the sensors 170 can be used to enhance the scan-data captured by the scanner 120 in one or more examples. The measurements can provide kinematic data of the transporter robot's 150 movement in the surrounding environment. Additionally, or alternatively, the measurements can include images, depth data, etc., of the surrounding environment.

In one or more examples, the camera 172a of the transporter robot 150 uses a wide-angle lens to capture 360-degree images of the surrounding images. Differences between two consecutive images can be computed to determine a change in the position/orientation of the transporter robot 150 using known techniques of image registration, segmentation, and analysis.

Further yet, the sensors 172 can facilitate detecting and reading one or more machine-readable codes in the surrounding environment. For example, markers with machine-readable codes can be placed at one or more locations in the surrounding environment. The machine-readable codes can include barcodes, QR codes, radio-frequency codes, or any other such machine-readable codes. The transporter robot 150, based on the machine-readable code encountered, can perform one or more particular operations. In addition, or alternatively, in response to the machine-readable code, the transporter robot 150 communicates one or more commands to the scanner 120 to perform corresponding operations.

For example, a machine-readable code can indicate to the transporter robot 150 that an "anchor scan" is to be captured by the scanner 120 from the location of the machine-readable code. In one or more examples, the machine-readable code can specify a particular location that is accessible by the transporter robot 150 to capture the anchor scan. An "anchor scan" refers to a scan-data captured by the scanner 120 is moving at a speed that is less than a predetermined threshold, such as when stationary, 12 inches per second, or any other such threshold.

An anchor scan is a fast 3600 scan (data capture) performed without moving the transporter robot 150 or by moving the transporter robot 150 at speed less than the threshold. This allows data matching without the need for IMU-based data fusion and can be used for difficult environments, where registering and stitching of the captured data can be difficult because of one or more characteristics of the surrounding environment. In some cases, a stationary scan can be viewed as an anchor scan if the environment is captured with sufficient quality. The anchor scan data is assigned a higher quality weight. The quality weight is used to define the cost for deviations from those points, providing at least the following advantages: less accurate mobile data nearby is corrected accordingly, and complete and potentially higher density data is created that allows registering with detailed features of smaller dimensions. In one or more examples, an anchor scan can be performed with the transporter robot 150 is moved at speed less than or equal to the predetermined threshold. However, in some cases, the anchor scan is performed when the transporter robot 150 unit is stationary. Thus, it can be said that the predetermined threshold is 0 km/hr in this case.

Figure 4:
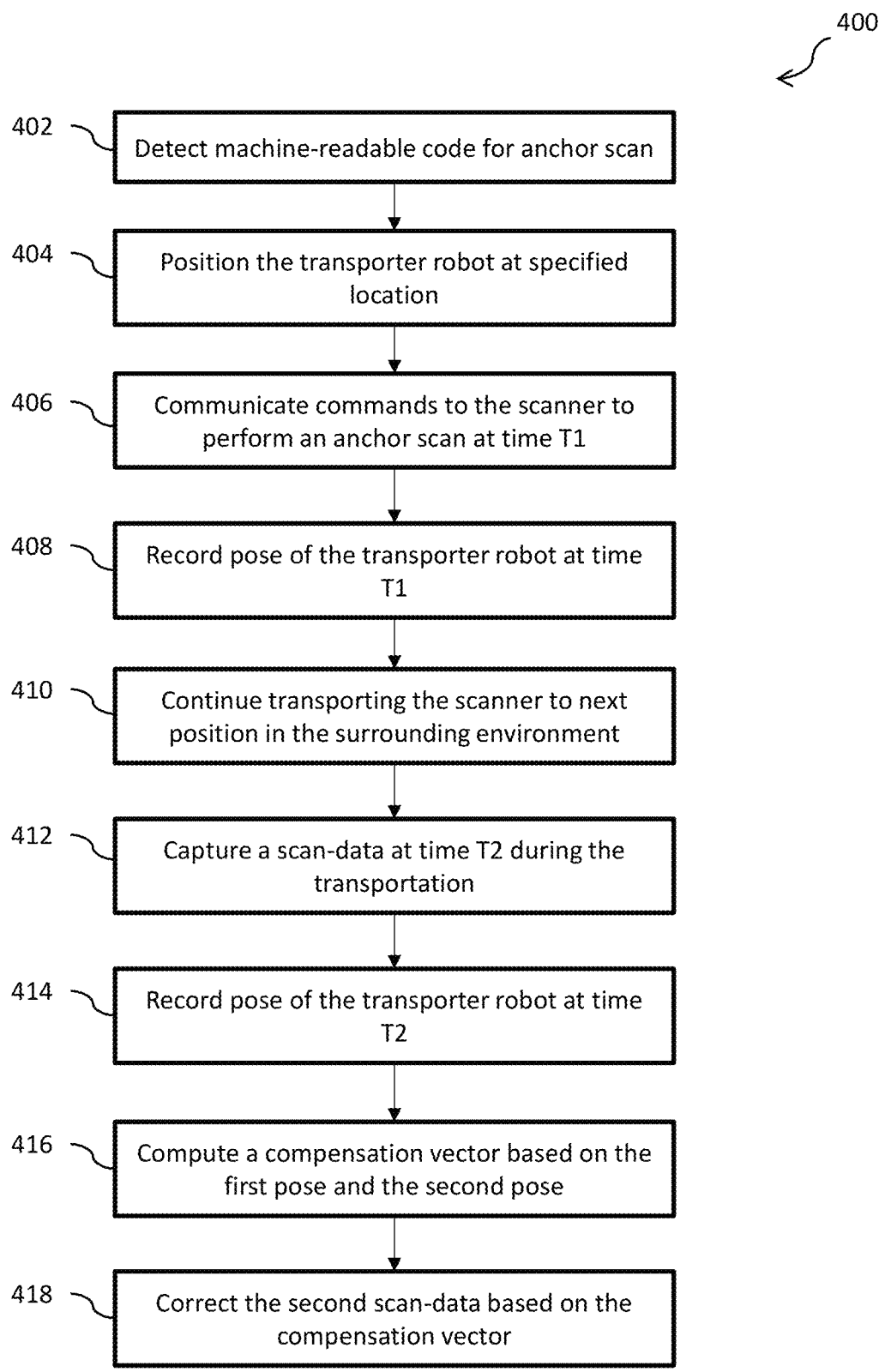
FIG. 4 depicts a flowchart of a method for capturing environmental scans using an automated transporter robot according to one or more embodiments.

FIG. 4 depicts a flowchart of a method for performing an anchor scan according to one or more embodiments. In method 400, the transporter robot 150 encounters a machine-readable code for an anchor scan at block 402. The machine-readable code can specify a particular location in the surrounding environment from where the anchor scan is to be performed.

The transporter robot 150 positions itself at the specified location in the surrounding environment, at block 404. The position can be specified in coordinates using a coordinate system of the surrounding environment. Alternatively, or in addition, the position can be specified using one or more landmarks in the surrounding environment. For example, the landmark can include semantic features of the surrounding environment, such as a corner, furniture, a window, a door, or any other such objects or characteristics in the surrounding environment. The landmark can be identified by the transporter robot 150 based on one or more images captured by the camera 172a.

Further, the transporter robot 150 facilitates communicating one or more commands to the scanner 120 to perform the anchor scan at block 406. In one or more examples, the transporter robot 150 sends such commands once it has reached the specified location and become stationary. The commands can be communicated to the scanner 120 via the computing device 110. For example, the transporter robot 150 indicates to the computing device 110 that the specified location has been reached and that the transporter robot 150 is now stationary.

A pose of the transporter robot 150 is recorded at which the anchor scan is captured, at block 408. The pose of the transporter robot 150 indicates an orientation of the motion devices 162, the mount 152, and any other component that can affect the pose of the scanning device 120.

The transporter robot 150 further continues according to a predetermined route to transport the scanner 120 to a subsequent location to continue scanning the surrounding environment, at block 410. The transporter robot 150 initiates the movement to the subsequent location once the scanner 120/computing device 110 indicates to the transporter robot 150 that the anchor scan has been completed.

During the transportation from the first location to the subsequent location, scanner 120 captures a second scan-data of the surrounding environment, at block 412. The scanner 120 captures the second scan-data while the transporter robot 150 is in motion and prior to the transporter robot 150 reaching the subsequent location. If the anchor scan is captured at timepoint T1, the scanner 120 captures the second scan-data at timepoint T2, and reaches the subsequent location at timepoint T3.

Further, the pose of the transporter robot 150 at the timepoint T2 at which the second scan-data was captured is recorded, at block 414. A compensation vector is computed between the first pose recorded at T1 and the second pose that is recorded at T2, at block 416. The compensation vector indicates a displacement of the transporter robot 150 from the first location of the anchor scan to the second location of the second scan-data capture. In addition, the compensation vector represents a motion, for example, a swaying, a rising (or falling) of the transporter robot 150 in relation to the first pose. In other words, the compensation vector indicates a change in position of the scanning device 120 in three dimensions—X, Y, and Z. The compensation vector represents not only changes in the position, but also any rotation, yaw, or any other change in the orientation of the scanner 120 in relation to the pose during the anchor scan.

In one or more embodiments, the compensation vector is further amended using changes in the pose of the scanner 120 itself. The change in the pose of the scanner 120 can be determined by the IMU 126. The change in the pose of the scanner 120 is independent of the changes in the transporter robot 150.

The second scan-data is corrected using the compensation vector, at block 418. The correction includes adjusting the coordinates of one or more points captured in the scan-data using the compensation vector. The compensation can include subtraction, addition, or any other vector operation to revise the second scan-data. In one or more embodiments, the compensation can also include correction of a rotation, skew, yaw, or any other adjustment in orientation/pose of the scanning device. The scan-data can be a point cloud in one or more examples.

Such compensation is repeated until another anchor scan is captured at the subsequent location. In one or more embodiments, the subsequent location is identified when another machine-readable code with such specifications is detected. Alternatively, or in addition, the transporter robot 150 causes another anchor scan to be captured after at least a predetermined duration has elapsed from the most recent anchor scan. Alternatively, or in addition, the transporter robot 150 causes another anchor scan to be captured after at least a predetermined distance has been traveled from the location where the most recent anchor scan was captured.

In one or more examples, the transporter robot 150 and the scanner 120, along with capturing the map 130, are also locating themselves within the environment. The system 100 uses odometry, which includes using data from motion or visual sensors to estimate the change in position of the transporter robot 150 and the scanner 120 over time. Odometry is used to estimate the position of the scanner 120 relative to a starting location. This method is sensitive to errors due to the integration of velocity measurements over time to give position estimates.

It should be noted that the implementation of the SLAM, local and global, itself is known, and also that embodiments of the present disclosure provide accurate data that can be used by such an implementation to provide an improved result of the SLAM implementation. The embodiments of the present disclosure, accordingly, facilitate improvement to computing technology. Further, embodiments of the present disclosure provide a practical application that facilitates generating the map 130 of an environment.

Figure 5:
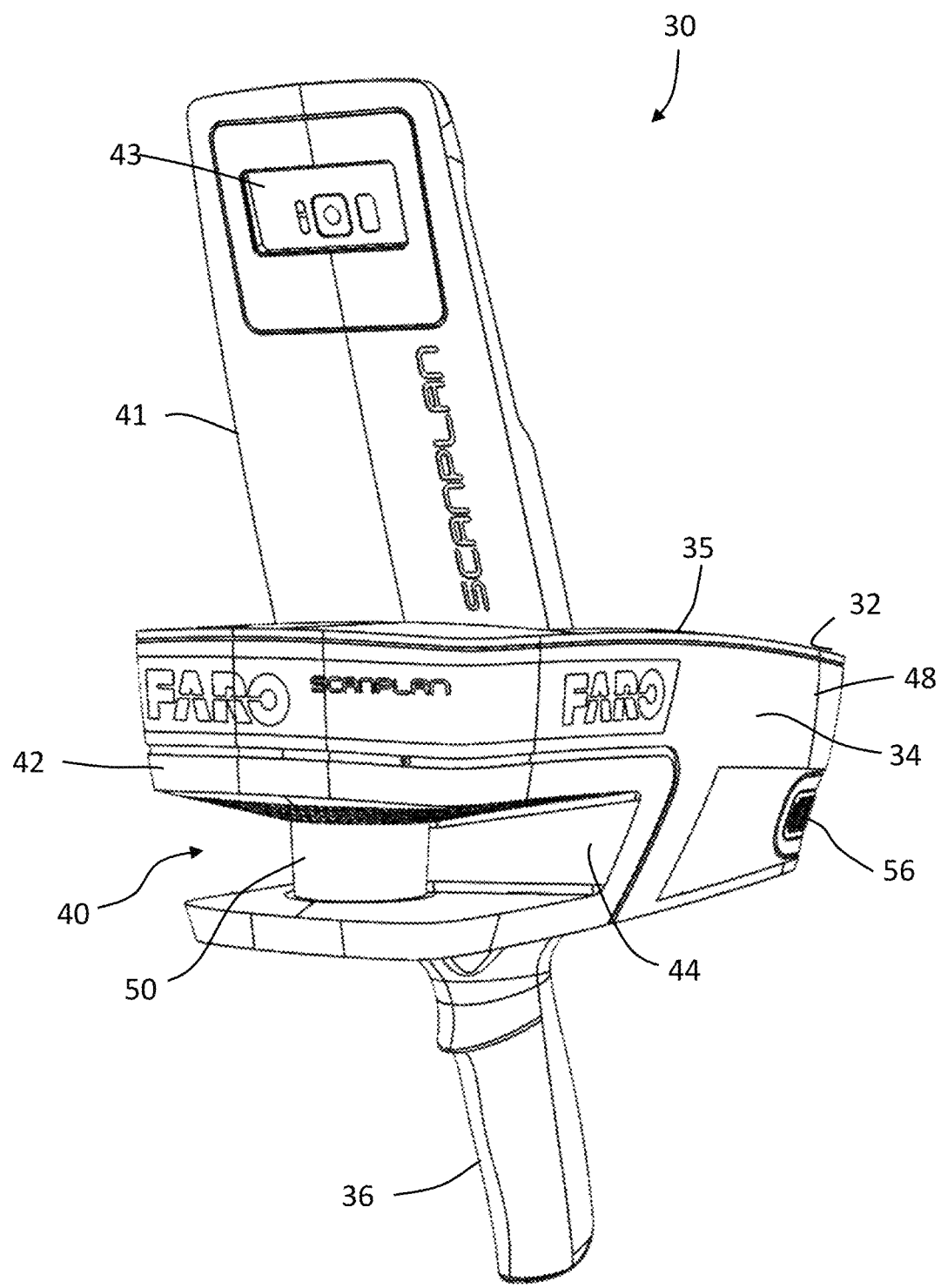
FIG. 5 depicts an embodiment of a scanner according to one or more embodiments of the present disclosure.
Figure 6:
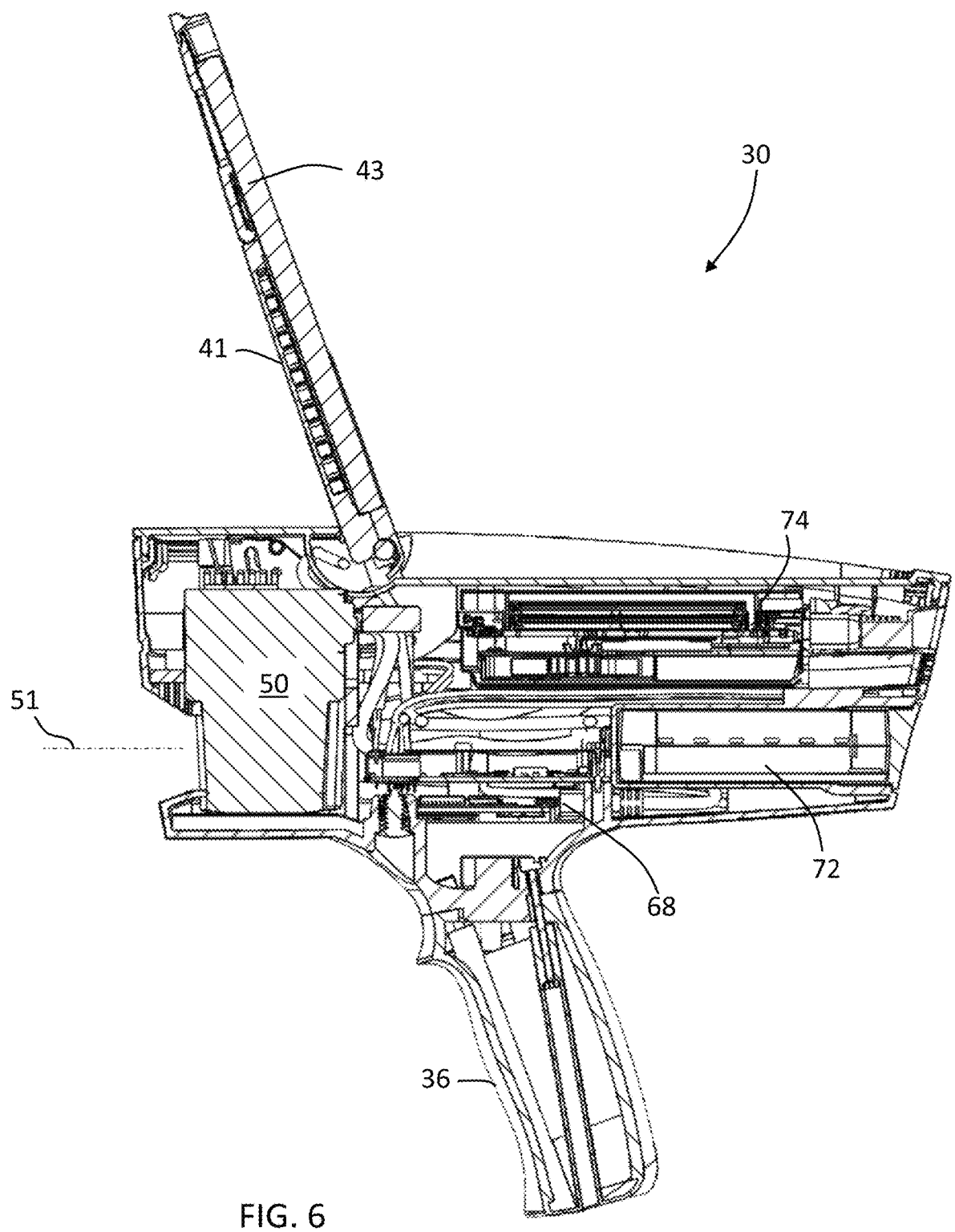
FIG. 6 depicts an embodiment of a scanner according to one or more embodiments of the present disclosure.
Figure 7:
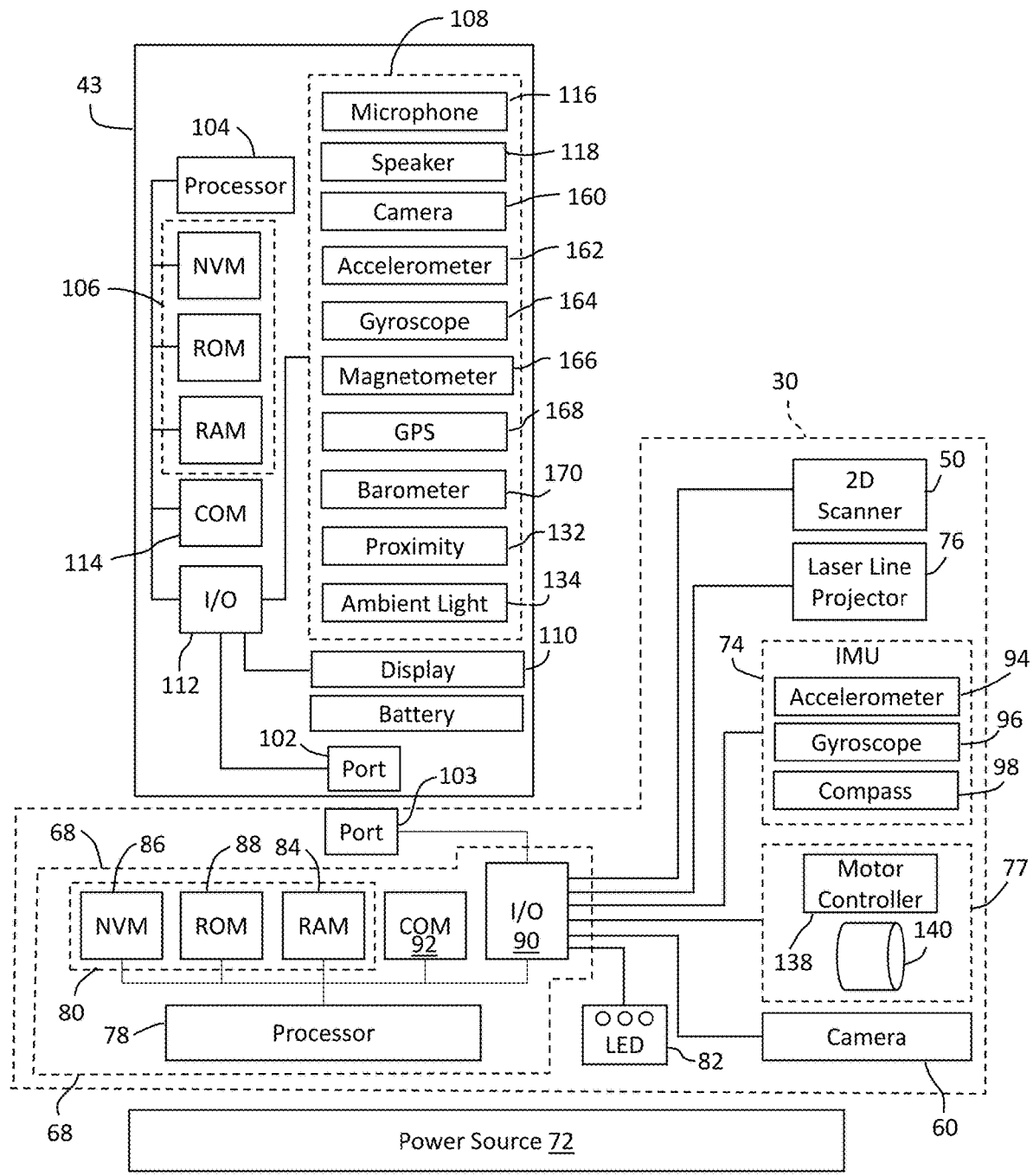
FIG. 7 depicts an embodiment of a scanner according to one or more embodiments of the present disclosure.

FIG. 5, FIG. 6, and FIG. 7 depict an embodiment of a system 30 having a housing 32 that includes a body portion 34 and a handle portion 36. The system 30 can be used as the scanner 120. In an embodiment, the handle 36 may include an actuator 38 that allows the operator to interact with the system 30. In the exemplary embodiment, the body 34 includes a generally rectangular center portion 35 with a slot 40 formed in an end 42. The slot 40 is at least partially defined by a pair walls 44 that are angled towards a second end 48. As will be discussed in more detail herein, a portion of a two-dimensional scanner 50 is arranged between the walls 44. The walls 44 are angled to allow the scanner 50 to operate by emitting a light over a large angular area without interference from the walls 44. As will be discussed in more detail herein, the end 42 may further include a three-dimensional camera or RGBD camera 60.

Extending from the center portion 35 is a mobile device holder 41. The mobile device holder 41 is configured to securely couple a mobile device 43 to the housing 32. The holder 41 may include one or more fastening elements, such as a magnetic or mechanical latching element for example, that couples the mobile device 43 to the housing 32. In an embodiment, the mobile device 43 is coupled to communicate with a controller 68. The communication between the controller 68 and the mobile device 43 may be via any suitable communications medium, such as wired, wireless or optical communication mediums for example.

In the illustrated embodiment, the holder 41 is pivotally coupled to the housing 32, such that it may be selectively rotated into a closed position within a recess 46. In an embodiment, the recess 46 is sized and shaped to receive the holder 41 with the mobile device 43 disposed therein.

In the exemplary embodiment, the second end 48 includes a plurality of exhaust vent openings 56. In an embodiment the exhaust vent openings 56 are fluidly coupled to intake vent openings 58 arranged on a bottom surface 62 of center portion 35. The intake vent openings 58 allow external air to enter a conduit 64 having an opposite opening 66 in fluid communication with the hollow interior 67 of the body 34. In an embodiment, the opening 66 is arranged adjacent to a controller 68 which has one or more processors that is operable to perform the methods described herein. In an embodiment, the external air flows from the opening 66 over or around the controller 68 and out the exhaust vent openings 56.

The controller 68 is coupled to a wall 70 of body 34. In an embodiment, the wall 70 is coupled to or integral with the handle 36. The controller 68 is electrically coupled to the 2D scanner 50, the 3D camera 60, a power source 72, an inertial measurement unit (IMU) 74, a laser line projector 76, and a haptic feedback device 77.

Elements are shown of the system 30 with the mobile device 43 installed or coupled to the housing 32. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 can convert the analog voltage or current level provided by 2D scanner 50, camera 60 and IMU 74 into a digital signal to determine a distance from the system 30 to an object in the environment. In an embodiment, the camera 60 is a 3D or RGBD type camera. Controller 68 uses the digital signals that act as input to various processes for controlling the system 30. The digital signals represent one or more system 30 data including but not limited to distance to an object, images of the environment, acceleration, pitch orientation, yaw orientation and roll orientation. As will be discussed in more detail, the digital signals may be from components internal to the housing 32 or from sensors and devices located in the mobile device 43.

In general, when the mobile device 43 is not installed, controller 68 accepts data from 2D scanner 50 and IMU 74 and is given certain instructions for the purpose of generating a two-dimensional map of a scanned environment. Controller 68 provides operating signals to the 2D scanner 50, the camera 60, laser line projector 76 and haptic feedback device 77. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user interface coupled to controller 68. The user interface may be one or more LEDs (light-emitting diodes) 82, an LCD (liquid-crystal diode) display, a CRT (cathode ray tube) display, or the like. A keypad may also be coupled to the user interface for providing data input to controller 68. In one embodiment, the user interface is arranged or executed on the mobile device 43.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 78 are coupled to memory 80. The memory 80 may include random access memory (RAM) device 84, a non-volatile memory (NVM) device 86, a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Controller 68 includes operation control methods described herein, which can be embodied in application code. These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

Coupled to the controller 68 is the 2D scanner 50. The 2D scanner 50 measures 2D coordinates in a plane. In the exemplary embodiment, the scanning is performed by steering light within a plane to illuminate object points in the environment. The 2D scanner 50 collects the reflected (scattered) light from the object points to determine 2D coordinates of the object points in the 2D plane. In an embodiment, the 2D scanner 50 scans a spot of light over an angle while at the same time measuring an angle value and corresponding distance value to each of the illuminated object points.

Examples of 2D scanners 50 include but are not limited to Model LMS103 scanners manufactured by Sick, Inc of Minneapolis, MN and scanner Models URG-04LX-UG01 and UTM-30LX manufactured by Hokuyo Automatic Co.,Ltd of Osaka, Japan. The scanners in the Sick LMS103 family measure angles over a 270-degree range and over distances up to 20 meters. The Hoyuko model URG-04LX-UG01 is a low-cost 2D scanner that measures angles over a 240-degree range and distances up to 4 meters. The Hoyuko model UTM-30LX is a 2D scanner that measures angles over a 270-degree range and to distances up to 30 meters. It should be appreciated that the above 2D scanners are exemplary and other types of 2D scanners are also available.

In an embodiment, the 2D scanner 50 is oriented so as to scan a beam of light over a range of angles in a generally horizontal plane (relative to the floor of the environment being scanned). At instants in time the 2D scanner 50 returns an angle reading and a corresponding distance reading to provide 2D coordinates of object points in the horizontal plane. In completing one scan over the full range of angles, the 2D scanner returns a collection of paired angle and distance readings. As the system 30 is moved from place to place, the 2D scanner 50 continues to return 2D coordinate values. These 2D coordinate values are used to locate the position of the system 30 thereby enabling the generation of a two-dimensional map or floorplan of the environment.

Also coupled to the controller 68 is the IMU 74. The IMU 74 is a position/orientation sensor that may include accelerometers 94 (inclinometers), gyroscopes 96, a magnetometer or compass 98, and altimeters. In the exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

The system 30 further includes a camera 60 that is a 3D or RGB-D camera. As used herein, the term 3D camera refers to a device that produces a two-dimensional image that includes distances to a point in the environment from the location of system 30. The 3D camera 30 may be a range camera or a stereo camera. In an embodiment, the 3D camera 30 includes an RGB-D sensor that combines color information with a per-pixel depth information. In an embodiment, the 3D camera 30 may include an infrared laser projector 31, a left infrared camera 33, a right infrared camera 39, and a color camera 37. In an embodiment, the 3D camera 60 is a RealSense™ camera model R200 manufactured by Intel Corporation. In still another embodiment, the 3D camera 30 is a RealSense™ LIDAR camera model L515 manufactured by Intel Corporation.

In an embodiment, when the mobile device 43 is coupled to the housing 32, the mobile device 43 becomes an integral part of the system 30. In an embodiment, the mobile device 43 is a cellular phone, a tablet computer or a personal digital assistant (PDA). The mobile device 43 may be coupled for communication via a wired connection, such as ports 103, 102. The port 103 is coupled for communication to the processor 78, such as via I/O controller 90 for example. The ports 103, 102 may be any suitable port, such as but not limited to USB, USB-A, USB-B, USB-C, IEEE 1394 (Firewire), or Lightning™ connectors.

The mobile device 43 is a suitable electronic device capable of accepting data and instructions, executing the instructions to process the data, and presenting the results. The mobile device 43 includes one or more processing elements 104. The processors may be microprocessors, field programmable gate arrays (FPGAs), digital signal processors (DSPs), and generally any device capable of performing computing functions. The one or more processors 104 have access to memory 106 for storing information.

The mobile device 43 can convert the analog voltage or current level provided by sensors 108 and processor 78. Mobile device 43 uses the digital signals that act as input to various processes for controlling the system 30. The digital signals represent one or more system 30 data including but not limited to distance to an object, images of the environment, acceleration, pitch orientation, yaw orientation, roll orientation, global position, ambient light levels, and altitude for example.

In general, mobile device 43 accepts data from sensors 108 and is given certain instructions for the purpose of generating or assisting the processor 78 in the generation of a two-dimensional map or three-dimensional map of a scanned environment. Mobile device 43 provides operating signals to the processor 78, the sensors 108 and a display 110. Mobile device 43 also accepts data from sensors 108, indicating, for example, to track the position of the mobile device 43 in the environment or measure coordinates of points on surfaces in the environment. The mobile device 43 compares the operational parameters to predetermined variances (e.g. yaw, pitch or roll thresholds) and if the predetermined variance is exceeded, may generate a signal. The data received by the mobile device 43 may be displayed on display 110. In an embodiment, the display 110 is a touch screen device that allows the operator to input data or control the operation of the system 30.

The controller 68 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 104 are coupled to memory 106. The memory 106 may include random access memory (RAM) device, a non-volatile memory (NVM) device, and a read-only memory (ROM) device. In addition, the processors 104 may be connected to one or more input/output (I/O) controllers 112 and a communications circuit 114. In an embodiment, the communications circuit 114 provides an interface that allows wireless or wired communication with one or more external devices or networks, such as the LAN or the cellular network discussed above.

Processor 104 includes operation control methods described herein, which can be embodied in application code. These methods are embodied in computer instructions written to be executed by processors 78, 104, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C #, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

Also coupled to the processor 104 are the sensors 108. The sensors 108 may include but are not limited to: a microphone 116; a speaker 118; a front or rear facing camera 160; accelerometers 162 (inclinometers), gyroscopes 164, a magnetometers or compass 126; a global positioning satellite (GPS) module 168; a barometer 170; a proximity sensor 132; and an ambient light sensor 134. By combining readings from a combination of sensors 108 with a fusion algorithm that may include a Kalman filter, relatively accurate position and orientation measurements can be obtained.

It should be appreciated that the sensors 60, 74 integrated into the scanner 30 may have different characteristics than the sensors 108 of mobile device 43. For example, the resolution of the cameras 60, 160 may be different, or the accelerometers 94, 162 may have different dynamic ranges, frequency response, sensitivity (mV/g) or temperature parameters (sensitivity or range). Similarly, the gyroscopes 96, 164 or compass/magnetometer may have different characteristics. It is anticipated that in some embodiments, one or more sensors 108 in the mobile device 43 may be of higher accuracy than the corresponding sensors 74 in the system 30. As described in more detail herein, in some embodiments the processor 78 determines the characteristics of each of the sensors 108 and compares them with the corresponding sensors in the system 30 when the mobile device. The processor 78 then selects which sensors 74, 108 are used during operation. In some embodiments, the mobile device 43 may have additional sensors (e.g. microphone 116, camera 160) that may be used to enhance operation compared to operation of the system 30 without the mobile device 43. In still further embodiments, the system 30 does not include the IMU 74 and the processor 78 uses the sensors 108 for tracking the position and orientation/pose of the system 30. In still further embodiments, the addition of the mobile device 43 allows the system 30 to utilize the camera 160 to perform three-dimensional (3D) measurements either directly (using an RGB-D camera) or using photogrammetry techniques to generate 3D maps. In an embodiment, the processor 78 uses the communications circuit (e.g. a cellular 4G internet connection) to transmit and receive data from remote computers or devices.

In the exemplary embodiment, the system 30 is a handheld portable device that is sized and weighted to be carried by a single person during operation. Therefore, the plane 136 in which the 2D scanner 50 projects a light beam may not be horizontal relative to the floor or may continuously change as the computer moves during the scanning process. Thus, the signals generated by the accelerometers 94, gyroscopes 96 and compass 98 (or the corresponding sensors 108) may be used to determine the pose (yaw, roll, tilt) of the system 30 and determine the orientation of the plane 51.

In an embodiment, it may be desired to maintain the pose of the system 30 (and thus the plane 136) within predetermined thresholds relative to the yaw, roll and pitch orientations of the system 30. In an embodiment, a haptic feedback device 77 is disposed within the housing 32, such as in the handle 36. The haptic feedback device 77 is a device that creates a force, vibration or motion that is felt or heard by the operator. The haptic feedback device 77 may be, but is not limited to: an eccentric rotating mass vibration motor or a linear resonant actuator for example. The haptic feedback device is used to alert the operator that the orientation of the light beam from 2D scanner 50 is equal to or beyond a predetermined threshold. In operation, when the IMU 74 measures an angle (yaw, roll, pitch or a combination thereof), the controller 68 transmits a signal to a motor controller 138 that activates a vibration motor 140. Since the vibration originates in the handle 36, the operator will be notified of the deviation in the orientation of the system 30. The vibration continues until the system 30 is oriented within the predetermined threshold or the operator releases the actuator 38. In an embodiment, it is desired for the plane 136 to be within 10-15 degrees of horizontal (relative to the ground) about the yaw, roll and pitch axes.

Figure 8:
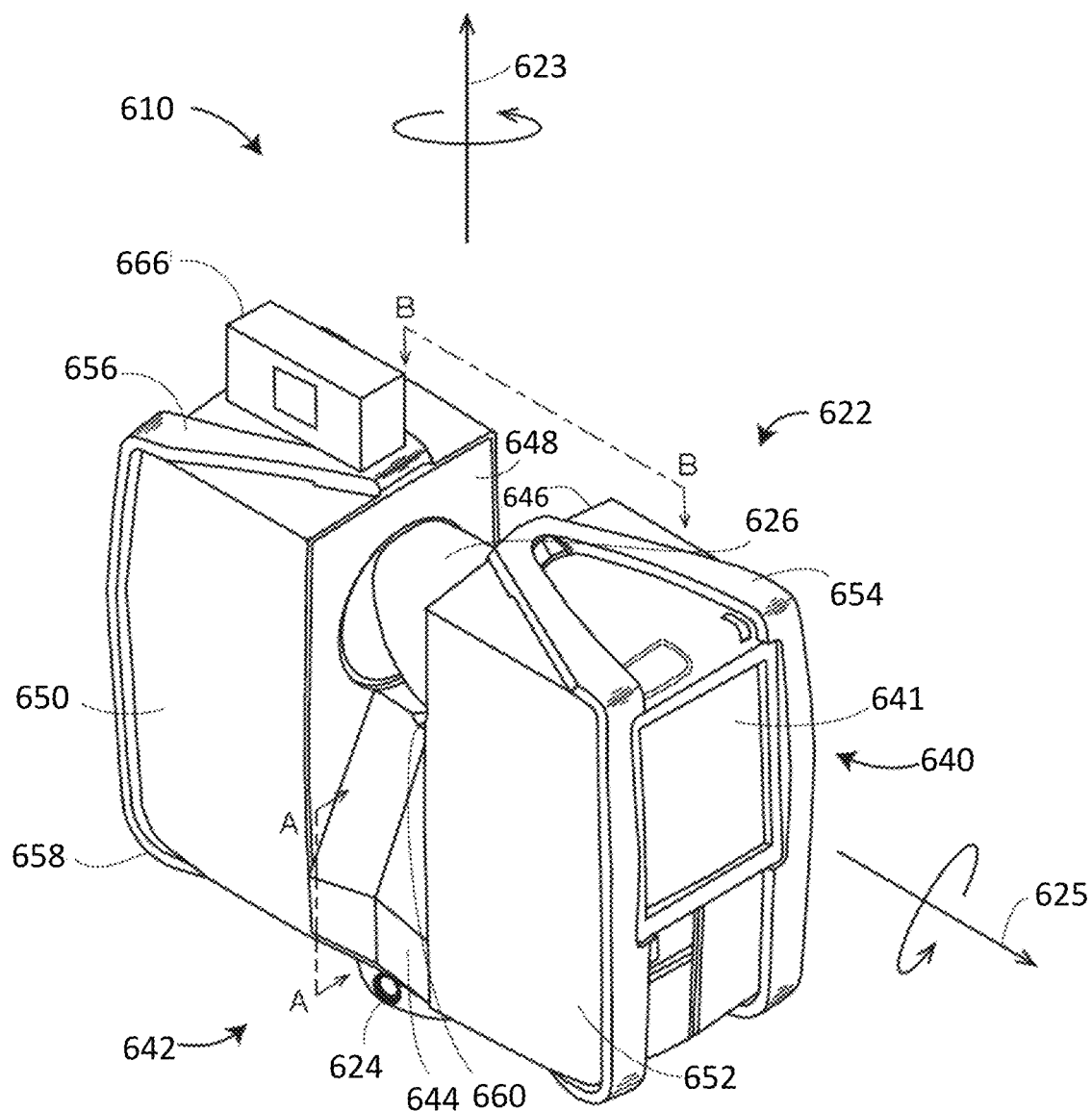
FIG. 8 depicts an embodiment of a scanner according to one or more embodiments of the present disclosure.
Figure 9:
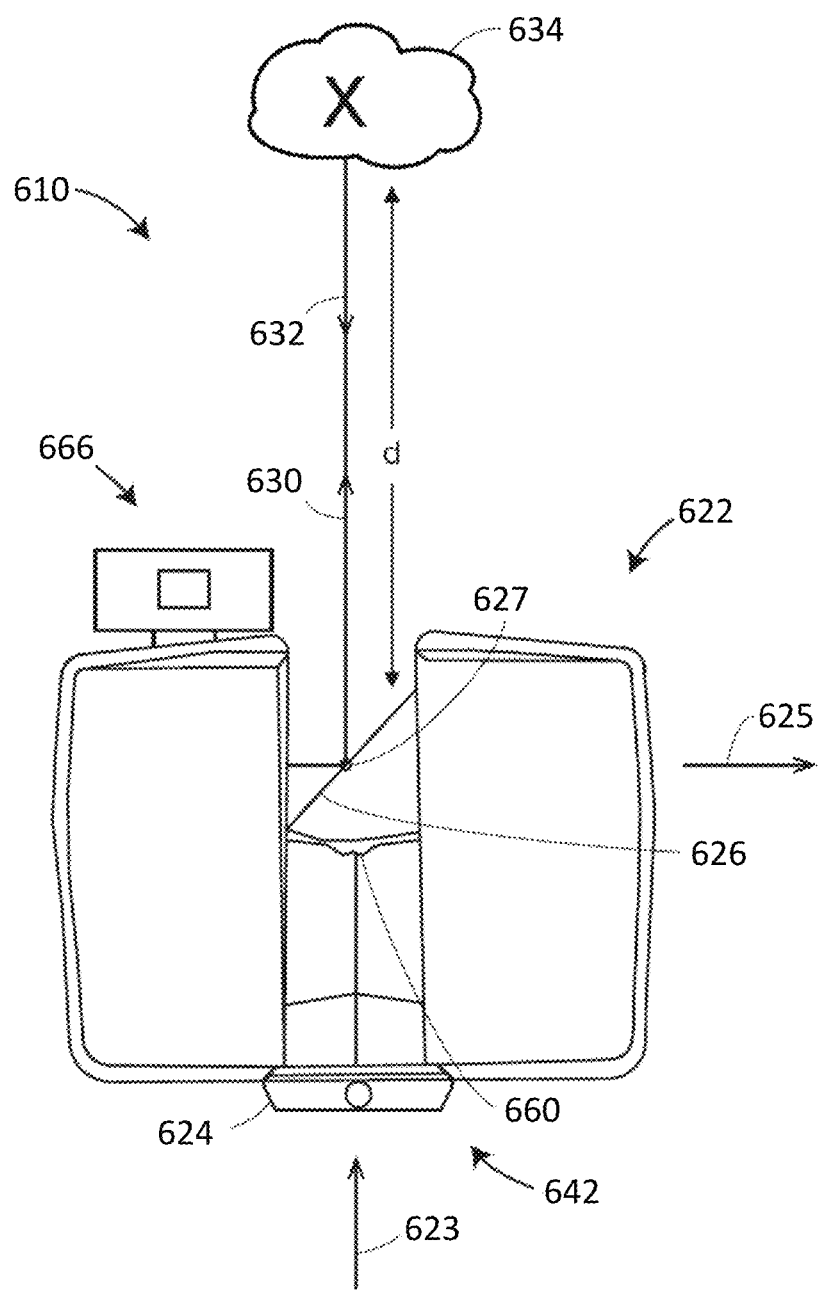
FIG. 9 depicts an embodiment of a scanner according to one or more embodiments of the present disclosure.
Figure 10:
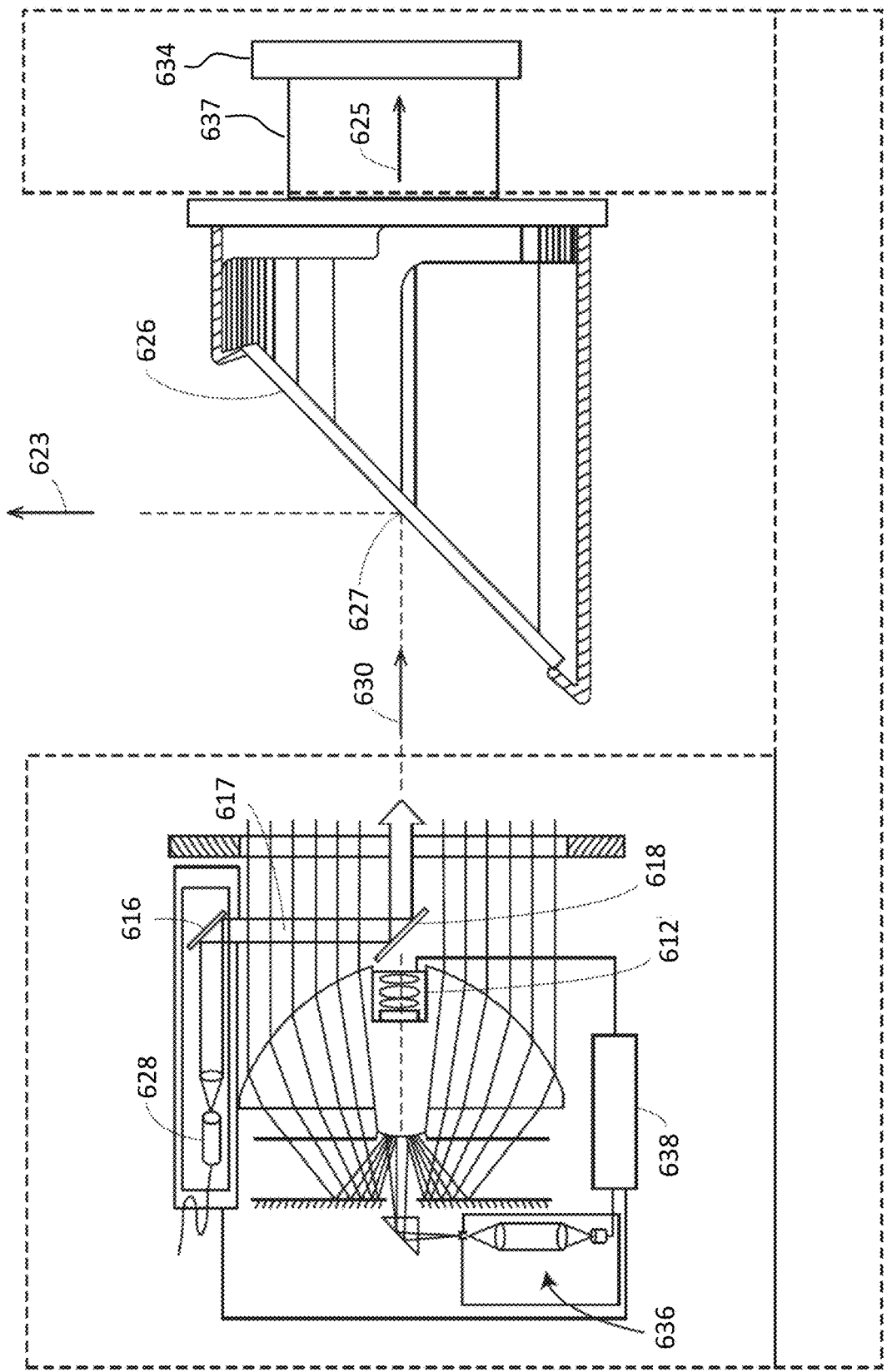
FIG. 10 depicts an embodiment of a scanner according to one or more embodiments of the present disclosure.

In an embodiment, the scanner 120 is a time-of-flight (TOF) laser scanner such as that shown and described in reference to FIGS. 8-10. Such a scanner 120 may be that described in commonly owned U.S. Pat. No. 8,705,012, which is incorporated by reference herein.

Referring now to FIGS. 8-10, an embodiment is shown of a laser scanner 610. In this embodiment, the laser scanner 610 has a measuring head 622 and a base 624. The measuring head 622 is mounted on the base 624 such that the laser scanner 610 may be rotated about a vertical axis 623. In one embodiment, the measuring head 622 includes a gimbal point 627 that is a center of rotation about the vertical axis 623 and a horizontal axis 625. The measuring head 622 has a rotary mirror 626, which may be rotated about the horizontal axis 625. The rotation about the vertical axis may be about the center of the base 624. In one embodiment, the vertical axis 623 is coaxial with the center axis of the post 109, 209, 309. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 622 is further provided with an electromagnetic radiation emitter, such as light emitter 628, for example, that emits an emitted light beam 630. In one embodiment, the emitted light beam 630 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 630 is amplitude or intensity modulated, for example, with a sinusoidal waveform or with a rectangular waveform. The emitted light beam 630 is emitted by the light emitter 628 onto a beam steering unit, such as mirror 626, where it is deflected to the environment. A reflected light beam 632 is reflected from the environment by an object 634. The reflected or scattered light is intercepted by the rotary mirror 626 and directed into a light receiver 636. The directions of the emitted light beam 630 and the reflected light beam 632 result from the angular positions of the rotary mirror 626 and the measuring head 622 about the axes 625, 623, respectively. These angular positions in turn depend on the corresponding rotary drives or motors.

Coupled to the light emitter 628 and the light receiver 636 is a controller 638. The controller 638 determines, for a multitude of measuring points X, a corresponding number of distances d between the laser scanner 610 and the points X on object 634. The distance to a particular point X is determined based at least in part on the speed of light in air through which electromagnetic radiation propagates from the device to the object point X. In one embodiment the phase shift of modulation in light emitted by the laser scanner 610 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the 3D measurement device 110 takes place by rotating the rotary mirror 626 relatively quickly about axis 625 while rotating the measuring head 622 relatively slowly about axis 623, thereby moving the assembly in a spiral pattern. This is sometimes referred to as a compound mode of operation. In an exemplary embodiment, the rotary mirror rotates at a maximum speed of 5820 revolutions per minute. For such a scan, the gimbal point 627 defines the origin of the local stationary reference system. The base 624 rests in this local stationary reference system. In other embodiments, another mode of operation is provided wherein the 3D measurement device 110 rotates the rotary mirror 626 about the axis 625 while the measuring head 622 remains stationary. This is sometimes referred to as a helical mode of operation.

In an embodiment, the acquisition of the 3D coordinate values further allows for the generation of a 3D trajectory, such as the 3D trajectory (e.g. 3D path) of the gimbal point 627 for example. This 3D trajectory may be stored and combined or fused with other data, such as data from the 2D scanner and/or from an inertial measurement unit for example, and used to register 3D coordinate data. It should be appreciated that the 3D trajectory may be transformed from the gimbal point 627 to any other location on the system, such as the base unit.

In addition to measuring a distance d from the gimbal point 627 to an object point X, the laser scanner 610 may also collect gray-scale information related to the received optical power (equivalent to the term "brightness.") The gray-scale value may be determined at least in part, for example, by integration of the bandpass-filtered and amplified signal in the light receiver 636 over a measuring period attributed to the object point X.

The measuring head 622 may include a display device 640 integrated into the laser scanner 610. The display device 640 may include a graphical touch screen 641, which allows the operator to set the parameters or initiate the operation of the laser scanner 610. For example, the screen 641 may have a user interface that allows the operator to provide measurement instructions to the device, and the screen may also display measurement results.

The laser scanner 610 includes a carrying structure 642 that provides a frame for the measuring head 622 and a platform for attaching the components of the laser scanner 610. In one embodiment, the carrying structure 642 is made from a metal such as aluminum. The carrying structure 642 includes a traverse member 644 having a pair of walls 646, 648 on opposing ends. The walls 646, 648 are parallel to each other and extend in a direction opposite the base 624. Shells 650, 652 are coupled to the walls 646, 648 and cover the components of the laser scanner 610. In the exemplary embodiment, the shells 650, 652 are made from a plastic material, such as polycarbonate or polyethylene for example. The shells 650, 652 cooperate with the walls 646, 648 to form a housing for the laser scanner 610.

On an end of the shells 650, 652 opposite the walls 646, 648 a pair of yokes 654, 656 are arranged to partially cover the respective shells 650, 652. In the exemplary embodiment, the yokes 654, 656 are made from a suitably durable material, such as aluminum for example, that assists in protecting the shells 650, 652 during transport and operation. The yokes 654, 656 each includes a first arm portion 658 that is coupled, such as with a fastener for example, to the traverse 644 adjacent the base 624. The arm portion 658 for each yoke 654, 656 extends from the traverse 644 obliquely to an outer corner of the respective shell 650, 652. From the outer corner of the shell, the yokes 654, 656 extend along the side edge of the shell to an opposite outer corner of the shell. Each yoke 654, 656 further includes a second arm portion that extends obliquely to the walls 646,648. It should be appreciated that the yokes 654, 656 may be coupled to the traverse 644, the walls 646, 648 and the shells 650, 654 at multiple locations.

In an embodiment, on top of the traverse 644, a prism 660 is provided. The prism extends parallel to the walls 646, 648. In the exemplary embodiment, the prism 660 is integrally formed as part of the carrying structure 642. In other embodiments, the prism 660 is a separate component that is coupled to the traverse 644. When the mirror 626 rotates, during each rotation the mirror 626 directs the emitted light beam 630 onto the traverse 644 and the prism 660. In some embodiments, due to non-linearities in the electronic components, for example in the light receiver 636, the measured distances d may depend on signal strength, which may be measured in optical power entering the scanner or optical power entering optical detectors within the light receiver 2436, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 636. Since the prism 2460 is at a known distance from the gimbal point 627, the measured optical power level of light reflected by the prism 660 may be used to correct distance measurements for other measured points, thereby allowing for compensation to correct for the effects of environmental variables such as temperature. In the exemplary embodiment, the resulting correction of distance is performed by the controller 638.

In an embodiment, the base 624 is coupled to a swivel assembly (not shown) such as that described in commonly owned U.S. Pat. No. 8,705,012 ('012), which is incorporated by reference herein. The swivel assembly is housed within the carrying structure 642 and includes a motor that is configured to rotate the measuring head 622 about the axis 623. In an embodiment, the angular/rotational position of the measuring head 622 about the axis 623 is measured by angular encoder. In the embodiments disclosed herein, the base (with or without the swivel assembly) may be mounted to the post 109, 209, 309.

An auxiliary image acquisition device 666 may be a device that captures and measures a parameter associated with the scanned area or the scanned object and provides a signal representing the measured quantities over an image acquisition area. The auxiliary image acquisition device 666 may be, but is not limited to, a pyrometer, a thermal imager, an ionizing radiation detector, or a millimeter-wave detector. In an embodiment, the auxiliary image acquisition device 766 is a color camera.

In an embodiment, a central color camera (first image acquisition device) 612 is located internally to the scanner and may have the same optical axis as the 3D scanning device. In this embodiment, the first image acquisition device 612 is integrated into the measuring head 622 and arranged to acquire images along the same optical pathway as emitted light beam 630 and reflected light beam 632. In this embodiment, the light from the light emitter 628 reflects off a fixed mirror 2416 and travels to dichroic beam-splitter 618 that reflects the light 617 from the light emitter 628 onto the rotary mirror 626. In an embodiment, the mirror 626 is rotated by a motor 637 and the angular/rotational position of the mirror is measured by angular encoder 634. The dichroic beam-splitter 618 allows light to pass through at wavelengths different than the wavelength of light 617. For example, the light emitter 628 may be a near infrared laser light (for example, light at wavelengths of 780 nm or 1150 nm), with the dichroic beam-splitter 618 configured to reflect the infrared laser light while allowing visible light (e.g., wavelengths of 400 to 700 nm) to transmit through. In other embodiments, the determination of whether the light passes through the beam-splitter 618 or is reflected depends on the polarization of the light. The digital camera 612 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 623 and by steering the mirror 626 about the axis 625. One or both of the color cameras 612, 666 may be used to colorize the acquired 3D coordinates (e.g. the point cloud).

In an embodiment, when the 3D scanner is operated in compound mode, a compound compensation may be performed to optimize the registration of data by combining or fusing sensor data (e.g. 2D scanner, 3D scanner and/or IMU data) using the position and orientation (e.g. trajectory) of each sensor.

It should be appreciated that while embodiments herein refer to the 3D scanner 610 as being a time-of-flight (phase shift or pulsed) scanner, this is for exemplary purposes and the claims should not be so limited. In other embodiments, other types of 3D scanners may be used, such as but not limited to structured light scanners, area scanners, triangulation scanners, photogrammetry scanners, or a combination of the foregoing.

Because of the variance in the 2D laser measurement data an offset may be continuously added to the measurement, which is typically removed using loop closure algorithms.

Figure 11:
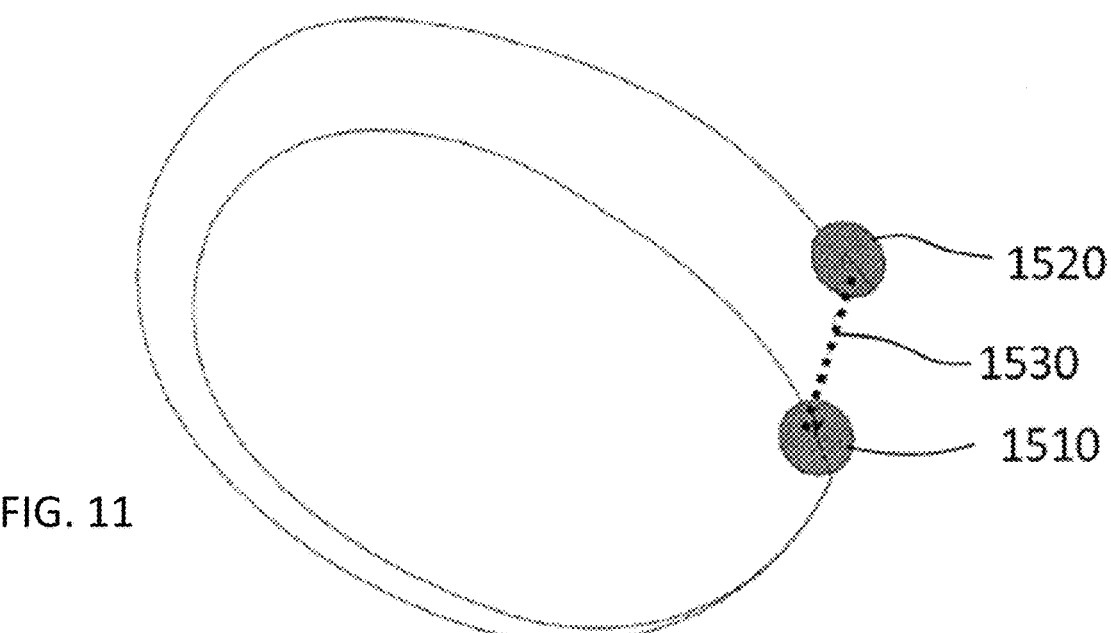
FIG. 11 depicts a representation of a drift error during a scanner being transported in an environment.

FIG. 11 schematically illustrates an example scenario in which an offset (sometimes referred to as "drift") is continuously introduced into the scan data. Consider that the 3D scanner 610 (its movement is tracked by the transporter robot 150) is moving from a starting position 1510 (real pose). After some movements the 3D scanner 610 is designated to return to an already mapped region, such as the starting position 1510, however the measured position due to sensor variation and the subsequent measurement error is a different position 1520 (estimated pose). The loop closure algorithm(s) that are typically used detect the loop closure correction 1530 and corrects the pose and the maps that have been acquired so far by the 3D scanner 610. As a consequence all positions in the map, including the scan positions, the registration points, and the points scanned and stored in the 3D scans, change their coordinates based on the loop closure correction 1530. In a pure mapping application this may not introduce inefficiencies or other issues, however for the 3D scanner 610 that uses scans from different scan positions, such a change in map coordinates leads to errors/inefficiencies because the scan positions are recorded before they are not automatically adapted in this manner.

Figure 12:
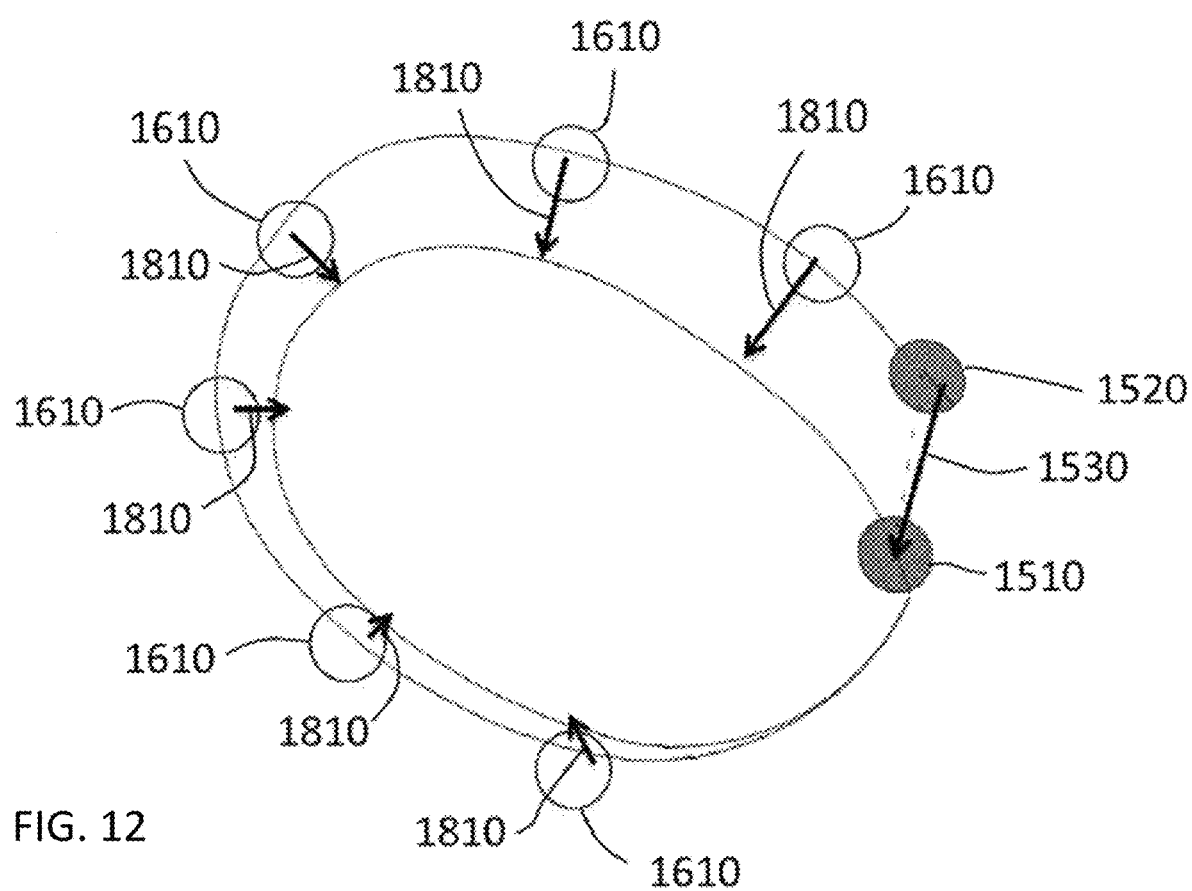
FIG. 12 depicts a representation of a loop closure according to one or more embodiments.
Figure 13:
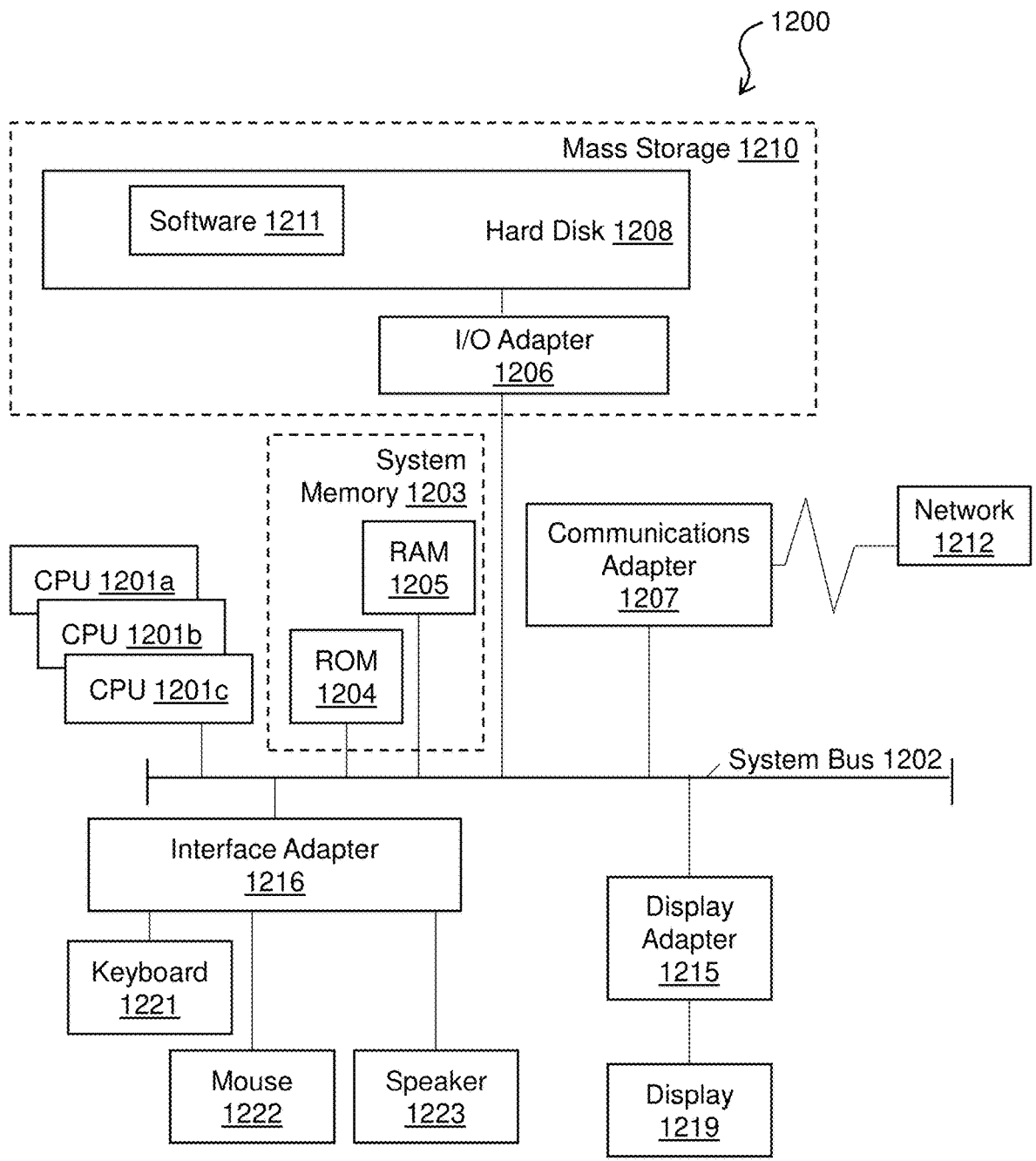
FIG. 13 depicts a computing system that can implement one or more embodiments of the present disclosure.

For example, FIG. 12 illustrates the accumulation of errors and inefficiencies. The 3D scanner 610 starts moving from the start position 1510. After some movement the 3D scanner 610 takes a 3D scan as described herein from one of a plurality of scan positions 1610. When the 3D scanner 610 arrives back in the start position 1510 the measurement error due to sensor data variance causes the estimated pose 1520 to differ from the start position 1510. As described herein the positions of the 3D scans are calculated from the transporter robot 150. Alternatively, or in addition, the positions in the 3D scans can be calculated based on a 2D scanner (e.g., SCANPLAN®) also mounted on the transporter robot 150. Accordingly, after loop closure the recorded 3D scan positions still have the same coordinates including the error while the map was corrected by the loop closure algorithm. Consequently the estimated positions of the 3D scans have a deviation. As described earlier, when the loop closure is applied all positions in the map change. But as the scan positions 1610 have been recorded before, the scan positions are not automatically adapted. As a consequence there are offsets between the scan positions 1610 and the map acquired by the 3D scanner 610. The error in a scan position and consequently the error of distance in the generated maps accumulates as the 3D scanner 610 is used. Accordingly, the longer the path taken by the 3D scanner 610, the larger the error(s) in the scan positions. By using a registration process (such as Cloud2Cloud registration for example) for the 3D scans the errors in the scan positions 1610 can be corrected in the 3D data. However, such registration process requires additional processing power and time, which is inefficient.

The technical solutions described herein overcome such errors and inefficiencies by using the pose measurements from the transporter robot 150. Further, in the examples where the transporter robot 150 uses the fixed machine-readable codes to initiate the anchor scans, the map 130 is built by the scanner 610 using objects with defined positions in the surrounding environment. The relative observation of the machine-readable code delivers an accurate position information and can correct the position of the 3D scanner 610 in the absolute world and remove absolute inaccuracies accumulated from the mapping process. The more machine-readable codes (observe with a good accuracy) the better the position accuracy of the 3D scanner 610 and consequently the absolute accuracy of the maps scanned by the 3D scanner 610. It should be noted that as used herein, "absolute accuracy" is the accuracy of measurements of a map that is scanned compared to a ground truth. For example, a side wall of a building has a real length of 100 m. The side wall when measured by the 3D scanner 610 is 101.1 m. In this case, there is an absolute error of 1.1 m and an absolute accuracy of >1.1 for distance >100 m.

In existing systems, such kind of errors in the scan positions are mitigated using loop closing. As described herein, loop closing is a technique that fits together parts that are mapped in a loop to reduce or minimize the error. However, for the loop closing to correct the errors, the scanning system has to make assumptions to generate a fit. Consequently, when a long path is stitched together by the loop closing algorithms other parts of the map (that are scanned prior to the error being accumulated) are also adapted without considering the exact accuracy, e.g. of length and angles.

It should be noted that the methods described herein can be implemented by one or more processors of the scanners mounted on the transporter robot 150. Alternatively, or in addition, the methods can be implemented by the one or more processors of the transporter robot 150. Further yet, in one or more examples, the methods may be executed by the computing device 110 that is separate from the scanner 120 and the transporter robot 150.

Embodiments described herein address the technical challenge of capturing a map of an environment simultaneously at the time when a scanning device is locating itself in the environment. In other words, a scanning device locates itself in an unknown environment and maps the unknown environment at the same time.

Turning now to FIG. 12, a computer system 1200 is generally shown in accordance with an embodiment. The computer system 1200 can be an electronic, computer framework comprising and/or employing any number and combination of computing devices and networks utilizing various communication technologies, as described herein. The computer system 1200 can be easily scalable, extensible, and modular, with the ability to change to different services or reconfigure some features independently of others. The computer system 1200 may be, for example, a server, desktop computer, laptop computer, tablet computer, or smartphone. In some examples, computer system 1200 may be a cloud computing node. Computer system 1200 may be described in the general context of computer system executable instructions, such as program modules, being executed by a computer system. Generally, program modules may include routines, programs, objects, components, logic, data structures, and so on that perform particular tasks or implement particular abstract data types. Computer system 1200 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system 1200 has one or more central processing units (CPU(s)) 1201a, 1201b, 1201c, etc. (collectively or generically referred to as processor(s) 1201). The processors 1201 can be a single-core processor, multi-core processor, computing cluster, or any number of other configurations. The processors 1201, also referred to as processing circuits, are coupled via a system bus 1202 to a system memory 1203 and various other components. The system memory 1203 can include a read only memory (ROM) 1204 and a random access memory (RAM) 1205. The ROM 1204 is coupled to the system bus 1202 and may include a basic input/output system (BIOS), which controls certain basic functions of the computer system 1200. The RAM is read-write memory coupled to the system bus 1202 for use by the processors 1201. The system memory 1203 provides temporary memory space for operations of said instructions during operation. The system memory 1203 can include random access memory (RAM), read only memory, flash memory, or any other suitable memory systems.

The computer system 1200 comprises an input/output (I/O) adapter 1206 and a communications adapter 1207 coupled to the system bus 1202. The I/O adapter 1206 may be a small computer system interface (SCSI) adapter that communicates with a hard disk 1208 and/or any other similar component. The I/O adapter 1206 and the hard disk 1208 are collectively referred to herein as a mass storage 1210.

Software 1211 for execution on the computer system 1200 may be stored in the mass storage 1210. The mass storage 1210 is an example of a tangible storage medium readable by the processors 1201, where the software 1211 is stored as instructions for execution by the processors 1201 to cause the computer system 1200 to operate, such as is described herein below with respect to the various Figures. Examples of computer program product and the execution of such instruction is discussed herein in more detail. The communications adapter 1207 interconnects the system bus 1202 with a network 1212, which may be an outside network, enabling the computer system 1200 to communicate with other such systems. In one embodiment, a portion of the system memory 1203 and the mass storage 1210 collectively store an operating system, which may be any appropriate operating system, such as the z/OS or AIX operating system from IBM Corporation, to coordinate the functions of the various components shown in FIG. 12.

Additional input/output devices are shown as connected to the system bus 1202 via a display adapter 1215 and an interface adapter 1216 and. In one embodiment, the adapters 1206, 1207, 1215, and 1216 may be connected to one or more I/O buses that are connected to the system bus 1202 via an intermediate bus bridge (not shown). A display 1219 (e.g., a screen or a display monitor) is connected to the system bus 1202 by a display adapter 1215, which may include a graphics controller to improve the performance of graphics intensive applications and a video controller. A keyboard 1221, a mouse 1222, a speaker 1223, etc. can be interconnected to the system bus 1202 via the interface adapter 1216, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 12, the computer system 1200 includes processing capability in the form of the processors 1201, and, storage capability including the system memory 1203 and the mass storage 1210, input means such as the keyboard 1221 and the mouse 1222, and output capability including the speaker 1223 and the display 1219.

In some embodiments, the communications adapter 1207 can transmit data using any suitable interface or protocol, such as the internet small computer system interface, among others. The network 1212 may be a cellular network, a radio network, a wide area network (WAN), a local area network (LAN), or the Internet, among others. An external computing device may connect to the computer system 1200 through the network 1212. In some examples, an external computing device may be an external webserver or a cloud computing node.

It is to be understood that the block diagram of FIG. 12 is not intended to indicate that the computer system 1200 is to include all of the components shown in FIG. 12. Rather, the computer system 1200 can include any appropriate fewer or additional components not illustrated in FIG. 12 (e.g., additional memory components, embedded controllers, modules, additional network interfaces, etc.). Further, the embodiments described herein with respect to computer system 1200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It will be appreciated that aspects of the present disclosure may be embodied as a system, method, or computer program product and may take the form of a hardware embodiment, a software embodiment (including firmware, resident software, micro-code, etc.), or a combination thereof. Furthermore, aspects of the present disclosure may take the form of a computer program product embodied in one or more computer-readable medium(s) having computer-readable program code embodied thereon.

One or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer-readable storage medium may be a tangible medium containing or storing a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

The computer-readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present disclosure are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:
    a transporter robot that comprises a motion controller and one or more motion apparatus that causes the transporter robot to change poses during transportation;
    a scanning device configured to capture a scan-data of a surrounding environment, the scanning device fixed to the transporter robot via a mount; and
    one or more processors operably coupled to the transporter robot and the scanning device, wherein the one or more processors are operable to generate a map of the surrounding environment by performing a method which comprises:
        recording, at a timepoint T1, at which the transporter robot is stationary at a first location, a first pose of the transporter robot;
        transporting the scanning device, by the transporter robot, from the first location to another location;
        during the transporting, at a timepoint T2, capturing, by the scanning device, the scan-data corresponding to a portion of the surrounding environment;
        in response to the capturing of the scan-data:
            receiving, from the motion controller, a second pose of the transporter robot at the timepoint T2;
            determining a compensation vector and a rotation for the scan-data based on a difference between the first pose and the second pose of the transporter robot;
            computing a revised scan-data based on the compensation vector and the rotation; and
            registering the revised scan-data to generate the map.

2. The system of claim 1, wherein the scan-data comprises a point cloud.

3. The system of claim 1, wherein the scanning device captures an anchor scan at the timepoint T1 at the first location.

4. The system of claim 3, wherein the scanning device captures another anchor scan at timepoint T3 at the another location.

5. The system of claim 1, wherein the pose of the transporter robot includes kinematics data indicative of a state of motion of the transporter robot.

6. The system of claim 1, wherein the pose of the transporter robot is determined using an image captured by a camera integrated with the transporter robot.

7. The system of claim 6, wherein the camera uses a wide-angle lens and the pose is determined by computing a difference between a first image captured at T1 and a second image captured at T2.

8. The system of claim 1, wherein determining the compensation vector and the rotation further comprises determining a difference between a first pose of the scanning device and a second pose of the scanning device, independent of the transporter robot, a pose of the scanning device is determined using an inertial measurement unit of the scanning device.

9. A method for generating a map of the surrounding environment, the method comprising:
    recording, by one or more processors, at a timepoint T1, at which a transporter robot is stationary at a first location, a first pose of the transporter robot, wherein the transporter robot is mounted with a scanning device configured to capture a scan-data of a surrounding environment;
    transporting the scanning device, by the transporter robot, from the first location to another location;
    during the transporting, at a timepoint T2, capturing, by the scanning device, the scan-data corresponding to a portion of the surrounding environment;
    in response to the capturing of the scan-data, performing by the one or more processors:
        receiving, from the transporter robot, a second pose of the transporter robot at the timepoint T2;

determining a compensation vector for the scan-data based on a difference between the first pose and the second pose of the transporter robot;

computing a revised scan-data based on the compensation vector; and registering the revised scan-data to generate the map.

10. The method of claim 9, wherein the scanning device captures an anchor scan at the timepoint T1 at the first location.

11. The method of claim 10, wherein the scanning device captures another anchor scan at timepoint T3 at the another location.

12. The method of claim 9, wherein the pose of the transporter robot includes kinematics data indicative of a state of motion of the transporter robot.

13. The method of claim 9, wherein the pose of the transporter robot is determined using an image captured by a camera integrated with the transporter robot.

14. The method of claim 13, wherein the camera uses a wide-angle lens and the pose is determined by computing a difference between a first image captured at T1 and a second image captured at T2.

15. The method of claim 9, wherein determining the compensation vector further comprises determining a difference between a first pose of the scanning device and a second pose of the scanning device, independent of the transporter robot, a pose of the scanning device is determined using an inertial measurement unit of the scanning device.

16. A non-transitory computer-readable medium having program instructions embodied therewith, the program instructions readable by a processor to cause the processor to perform a method to generate a map of a surrounding environment, the method comprising:

recording at a timepoint T1, at which a transporter robot is stationary at a first location, a first pose of the transporter robot, wherein the transporter robot is mounted with a scanning device configured to capture scan-data of surrounding environment;

transporting the scanning device, by the transporter robot, from the first location to another location;

during the transporting, at a timepoint T2, capturing, by the scanning device, the scan-data corresponding to a portion of the surrounding environment;

in response to the capturing of the scan-data:
  receiving, from the transporter robot, a second pose of the transporter robot at the timepoint T2;
  determining a compensation vector for the scan-data based on a difference between the first pose and the second pose of the transporter robot;
  computing a revised scan-data based on the compensation vector; and
  registering the revised scan-data to generate the map.

17. The non-transitory computer-readable medium of claim 16, wherein the scanning device captures an anchor scan at the timepoint T1 at the first location, and captures another anchor scan at timepoint T3 at the another location.

18. The non-transitory computer-readable medium of claim 16, wherein the pose of the transporter robot includes kinematics data indicative of a state of motion of the transporter robot.

19. The non-transitory computer-readable medium of claim 16, wherein the pose of the transporter robot is determined using an image captured by a camera integrated with the transporter robot.

20. The non-transitory computer-readable medium of claim 16, wherein determining the compensation vector further comprises determining a difference between a first pose of the scanning device and a second pose of the scanning device, independent of the transporter robot, a pose of the scanning device is determined using an inertial measurement unit of the scanning device.

* * * * *